US012591160B1

(12) United States Patent
Dickey et al.

(10) Patent No.: US 12,591,160 B1
(45) Date of Patent: Mar. 31, 2026

(54) PREDICTION AND CORRECTION OF HARDWARE FAILURES OF ELECTROCHROMIC DEVICES

(71) Applicant: Halio, Inc., Hayward, CA (US)

(72) Inventors: Jerimiah Dickey, Farmington, UT (US); Stephen Lawrence, Salt Lake City, UT (US); Min Yang, Hayward, CA (US)

(73) Assignee: Halio, Inc., Hayward, CA (US)

( * ) Notice: Subject to any disclaimer, the term of this patent is extended or adjusted under 35 U.S.C. 154(b) by 591 days.

(21) Appl. No.: 17/089,612

(22) Filed: Nov. 4, 2020

Related U.S. Application Data

(60) Provisional application No. 62/930,957, filed on Nov. 5, 2019.

(51) Int. Cl.
| | |
|---|---|
| *G02F 1/15* | (2019.01) |
| *F21V 14/00* | (2018.01) |
| *G02F 1/01* | (2006.01) |
| *G02F 1/1523* | (2019.01) |
| *G02F 1/155* | (2006.01) |
| *G02F 1/157* | (2006.01) |
| *G02F 1/163* | (2006.01) |
| *G09G 3/19* | (2006.01) |

(52) U.S. Cl.
CPC ............ *G02F 1/1525* (2013.01); *G02F 1/155* (2013.01); *G02F 1/163* (2013.01)

(58) Field of Classification Search
CPC ...... G02F 1/155; G02F 1/1525; G02F 1/1523; G02F 1/1521; G02F 1/1533; G02F 1/03; G02F 1/0316; G02F 1/163; C09K 9/02; B60R 1/088; H04N 9/3137; H04N 9/22

USPC ........ 359/265–275, 277, 245–247, 254, 242; 345/49, 105; 348/817; 438/929
See application file for complete search history.

(56) References Cited

U.S. PATENT DOCUMENTS

| | | | | |
|---|---|---|---|---|
| 9,188,828 B1 * | 11/2015 | Chung | ................... | G02F 1/155 |
| 2012/0188627 A1 * | 7/2012 | Chen | ....................... | H04Q 9/00 |
| | | | | 359/275 |

(Continued)

FOREIGN PATENT DOCUMENTS

| | | | | | |
|---|---|---|---|---|---|
| CN | 110135656 A | * | 8/2019 | ............. | G02F 1/163 |
| JP | H08304854 A | * | 11/1996 | | |

(Continued)

*Primary Examiner* — Dawayne Pinkney
(74) *Attorney, Agent, or Firm* — Lowenstein Sandler LLP

(57) ABSTRACT

A system for detecting and correcting hardware failures in electrochromic devices is described. The system may include a memory to store data and a processing device coupled to the memory. The processing device causes a tinting state of an electrochromic device to correspond to a first tinting state, receives first sensor data corresponding to a first point in time after causing the tinting state to correspond to the first tinting state, and receives second sensor data corresponding to a second point in time that is a period of time after the first point in time. The period of time is without directing change of tinting state of the electrochromic device. In response to determining, based on the first and second sensor data, that a corrective action is to be performed for the electrochromic device, the processing device causes the corrective action to be performed for the electrochromic device.

16 Claims, 12 Drawing Sheets

(56)  References Cited

U.S. PATENT DOCUMENTS

| | | | | |
|---|---|---|---|---|
| 2015/0097944 | A1* | 4/2015 | Palm | ..................... G01N 25/72 |
| | | | | 382/141 |
| 2018/0143501 | A1 | 5/2018 | Nagel | |
| 2020/0117067 | A1* | 4/2020 | Wang | ..................... G02F 1/163 |
| 2021/0088867 | A1* | 3/2021 | Nagel | ............... G01N 21/8851 |
| 2021/0109418 | A1* | 4/2021 | Reddy | ..................... E06B 9/24 |

FOREIGN PATENT DOCUMENTS

| | | | | | |
|---|---|---|---|---|---|
| JP | 2019085871 | A | * | 6/2019 | .............. E06B 9/24 |
| WO | WO-2017059362 | A1 | * | 4/2017 | .......... E06B 3/6722 |

\* cited by examiner

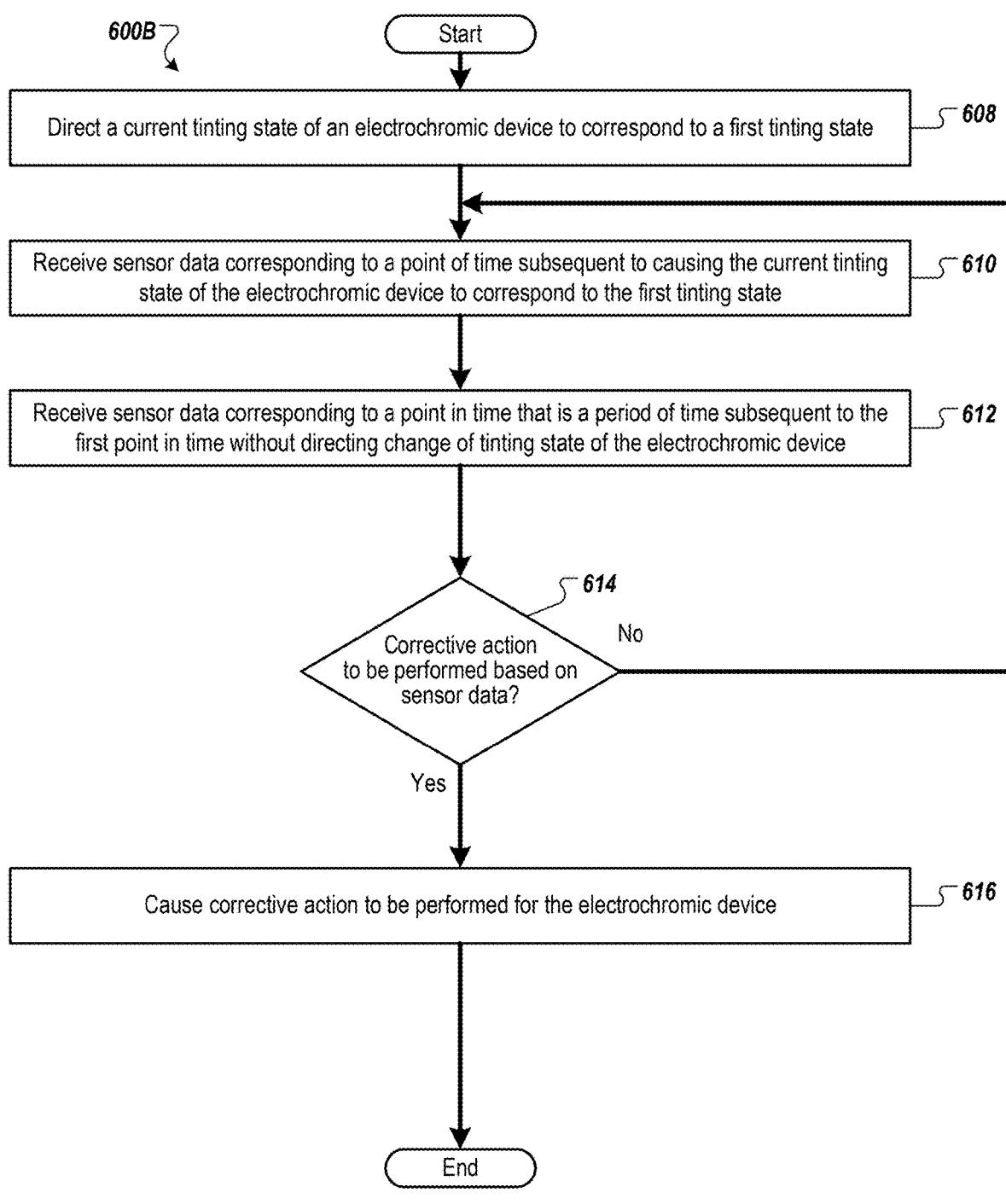

*600B*

Start

Direct a current tinting state of an electrochromic device to correspond to a first tinting state — 608

Receive sensor data corresponding to a point of time subsequent to causing the current tinting state of the electrochromic device to correspond to the first tinting state — 610

Receive sensor data corresponding to a point in time that is a period of time subsequent to the first point in time without directing change of tinting state of the electrochromic device — 612

Corrective action to be performed based on sensor data? — 614

No

Yes

Cause corrective action to be performed for the electrochromic device — 616

End

FIG. 6B

PREDICTION AND CORRECTION OF HARDWARE FAILURES OF ELECTROCHROMIC DEVICES

RELATED APPLICATION

This application claims the benefit of U.S. Provisional No. 62/930,957, filed Nov. 5, 2019, the entire content of which is incorporated by reference.

BACKGROUND

An electrochromic glass unit uses electrochromic glass that can change transmissivity with the application of electric current and voltage. The change of transmissivity typically relies on a reversible oxidation of a material. Electrochromic glass units can darken at the press of a button or other triggering events and are also often used in building windows to reduce glare and solar heat gains.

BRIEF DESCRIPTION OF DRAWINGS

The present disclosure will be understood more fully from the detailed description given below and from the accompanying drawings of various embodiments, which, however, should not be taken to limit the present disclosure to the specific embodiments, but are for explanation and understanding only.

FIG. 5 is a block diagram illustrating a system for generating predictive data, according to certain embodiments.

FIG. 6A-E are flow diagrams of methods for detection and correction of hardware failures of an electrochromic device, according to certain embodiments.

DETAILED DESCRIPTION

Figure 1:
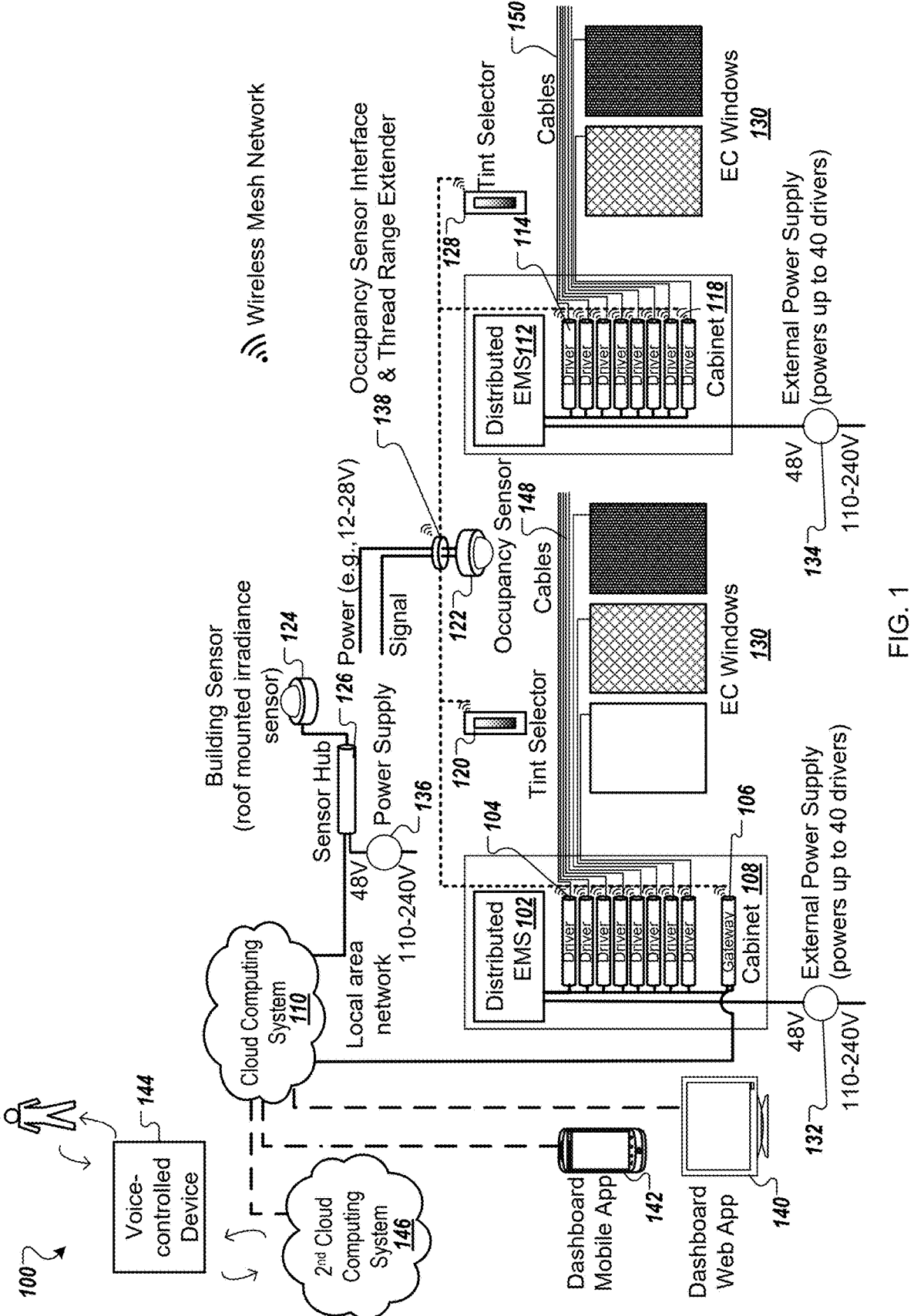
FIG. 1 is a block diagram of an electrochromic window system that provides control of an electrochromic device, according to certain embodiments.

A cloud-based system for prediction and correction of hardware failures in electrochromic devices is described. Electrochromic devices can be, for example, used for smart windows (e.g., electrochromic windows) in a commercial or residential building. A smart window refers to one or more glass units whose characteristics (e.g., a tint level representing a particular transmissivity parameter, optical scattering characteristics, etc.) can be changed automatically (e.g., at a particular time, in response to a weather condition, etc.). Selectively tinting smart windows may allow some control of solar heat gain of a building to decrease energy used for heating and/or cooling (e.g., tinting smart windows on sunny summer days allows for less solar heat gain, untinting smart windows in sunny winter days allows for more solar heat gain). Selectively tinting smart windows may provide effective use of daylight (e.g., daylighting) to decrease energy used for lighting. Whereas properly controlled smart windows may reduce energy used for heating, cooling, and lighting, improper control of smart windows may increase energy consumption and decrease user comfort (e.g., not properly allowing natural light, allowing glare from direct sunlight, etc.). A modern multi-story building can include thousands of external and internal windows. As such, controlling electrochromic devices in an efficient manner becomes increasingly important.

The ability to control an electrochromic device in an efficient manner depends in part on the physical characteristics of an electrochromic device. The physical characteristics of an electrochromic device may be affected by the materials used to produce the electrochromic device, the manufacturing of the electrochromic device, transportation associated with the electrochromic device (e.g., transportation of the materials to produce the electrochromic device, physical stages of the electrochromic device, the completed electrochromic device, etc.), installation of the electrochromic device, use of the electrochromic device, and the like. The physical characteristics of an electrochromic device may cause a hardware failure and/or may affect the lifespan of the electrochromic device. Conventionally, physical characteristics that may cause a hardware failure and/or lifespan of an electrochromic device may not be known. Conventionally, hardware failures and/or reduced lifespan of an electrochromic device are detected once an electrochromic device fails to properly function (e.g., non-uniform tinting state, non-uniform changing of tinting state, abnormal speed of changing of tinting state, not keeping a tinting state, failing to change tinting state, etc.). An electrochromic device failing to properly function may cause increased energy consumption and decreased user comfort. Conventionally, to remedy an electrochromic device that is failing to properly function, a new electrochromic device is manufactured, transported, and installed. Conventionally, the cause of the hardware failure and/or decrease in lifespan of the electrochromic device is unknown (e.g., may have been caused by any number of physical characteristics of the electrochromic device and/or usage in an electrochromic window system). Conventional systems generally collect data locally within a local area network (LAN). Thus, the data cannot be used to review and diagnose causes at other locations using similar systems. Visual inspection of a failed panel is also unlikely to identify the causes of hardware failures and/or decrease in lifespan with the electrochromic device or system due to the many possible causes of hardware failures and the small visual scale on which hardware failures can occur. An electrochromic device is in effect, a small battery. An example of a hardware failure is a leaky panel. A defect within an electrochromic device (e.g., small defects within a layer of an electrochromic device) may cause charge to slowly leak from the electrochromic device, causing the electrochromic device (e.g., a leaky panel) to be noticeably clearer over time (e.g., does not maintain a tinting state). Conventional system may not aggregate enough data to provide for sufficient analytics across all possible hardware failure cases.

Aspects of the present disclosure address the deficiencies of conventional systems by providing a system for predicting and correcting hardware failures in electrochromic devices. In some embodiments, a server device may direct a current tinting state of an electrochromic device to correspond to a first tinting state and receive sensor data associated with directing of the current tinting state of the first electrochromic device to correspond to the first tinting state. Directing the current tint level to correspond to a first tint level may include causing an electric charge to enter the electrochromic device (e.g., a predetermined amount of electric charge corresponding to the first tint level). The sensor data received may be voltage data, current data, manufacturing data, image data, and/or other sensor data which track a functioning condition of the electrochromic device. The server device may receive first sensor data corresponding to a first point in time after the directing of the current tinting state of the electrochromic device to correspond to the first tinting state and at a second point in time that is a period of time after the first point in time.

The server device may determine, based on the sensor data (e.g., the first sensor data corresponding to the first point in time and the second sensor data corresponding to the second point in time), whether a corrective action is to be performed for the electrochromic device (e.g., determine whether a hardware failure has occurred or is predicted to occur). To determine whether a corrective action is to be performed, the server device may compare the sensor data to previous sensor data (e.g., before causing the current tinting state of the electrochromic device to correspond to the first tinting state) of the same electrochromic device, to historical sensor data of other electrochromic devices (e.g., electrochromic devices without any defects, electrochromic devices with and without defects, or the like), and/or threshold values (e.g., voltage threshold values for the electrochromic device). The server device may determine that a corrective action should be performed responsive to the sensor data being abnormal, the sensor data not matching previous sensor data of the electrochromic device (e.g., a difference between the first sensor data and the second sensor data being greater than a threshold difference), the sensor data not matching previous sensor data of electrochromic devices that do not have defects, the sensor data matching previous sensor data of electrochromic devices that have defects, the sensor data not meeting threshold values, or the like. Responsive to determining that a corrective action should be performed, the server device may cause the corrective action to be performed. The corrective action may include one or more of providing an alert to a user (e.g., via a graphical user interface (GUI) identifying a defect or a predicted defect), identifying a defect in the electrochromic device, causing an electrical current to be applied to maintain the first tinting state (e.g., to counteract the leaking), using a second control component instead of a first control component, causing replacement of one or more components associated with the electrochromic device, or the like.

In some embodiments, a trained machine learning model may be used to determine (predict) whether a corrective action should be performed for an electrochromic device. In some embodiments, a server device may receive historical data. The historical data may include historical sensor data (e.g., voltage data, electrical current data, temperature data, image data, or the like) and historical performance data of electrochromic devices (e.g., actual tinting state compared to desired tinting state, not defective, defective, abnormal, lifespan, or the like). One or more portions of the historical data may be processed (e.g., historical sensor data may be processed to generate color space values, historical sensor data may be processed to determine differences in values over a period of time). In some embodiments, the server device may train a machine learning model using training data including historical sensor data (e.g., without historical performance data). The trained machine learning model may cluster subsets of sensor data together. In some embodiments, the server device may train a machine learning model using training data including historical sensor data and historical performance data. The trained machine learning model may map certain values of sensor data to certain values of performance data to provide classifications for electrochromic devices (e.g., to classify as defective, not defective, actual tinting state is within a threshold percentage of the desired tinting state, types of corrective action, or the like).

A server device may provide current sensor data of an electrochromic device as input to the trained machine learning model. The server device may obtain, from the trained machine learning model, one or more outputs indicative of predictive data. In some embodiments, the predictive data is indicative of whether the electrochromic device is abnormal (e.g., current sensor data does not match a clustered subset of historical sensor data). In some embodiments, the predictive data may indicate a classification for the electrochromic device (e.g., the current sensor data matches a mapping of historical sensor data to historical performance data, etc.). The server device may determine, based on the predictive data, whether a corrective action is to be performed for the electrochromic device.

Aspects of the present disclosure result in technological advantages of significant reduction in energy consumption (e.g., battery consumption, heating energy, cooling energy, lighting energy, etc.), required bandwidth, processor overhead, user time, hardware failure detection costs, as well as reducing wasted material and discarded electrochromic devices due to inability or large costs of troubleshooting hardware failure. In some embodiments, the corrective action may provide for proper functioning of the electrochromic device without its removal and installation of a new electrochromic device (e.g., via supplementing charge via a driver when a leaky panel is detected). In some embodiments, sensor data collected during different stages of manufacturing can be used to help more accurately identify hardware failures of an electrochromic device. Additionally, the data collected during manufacturing may also be used to determine if and which manufacturing stages or processes may be adjusted based on whether there is a correlation between defective devices and a particular manufacturing process. Instead of being limited to local analytics as in conventional systems, the server device can perform analytics based on data received from multiple gateways and sensor hubs. By not being limited to local devices and local analytics of a local computer, the cloud-based system may thereby provide more accurate control of electrochromic devices.

Although embodiments of the present disclosure describe detection (e.g., hardware failure detection, software error detection, defect detection, physical property detection, or the like), prediction (e.g., failure prediction, error prediction, lifespan prediction, or the like), and corrective actions (e.g., due to detection and/or prediction) performed by a cloud computing system (e.g., server device, control module, corrective control module 222, etc.), one or more detection, prediction, and/or corrective actions may be performed by other components of an electrochromic window system. For example a client device (e.g., end device, gateway, driver, etc.) may perform one or more of detection, prediction, or corrective actions. In some embodiments, a client device (e.g., gateway, driver) receives a trained machine learning model (e.g., from the cloud computing system) and performs one or more of detection, prediction, or corrective actions based on output of the trained machine learning model responsive to providing sensor data to the trained machine learning model. In some embodiments, a client device (e.g., gateway, driver) trains or retrains a machine learning model based on sensor data and performance data (e.g., in addition to the client device also using the trained machine learning model). In some embodiments, a client device (e.g., gateway, driver) trains a machine learning model and/or uses a trained machine learning model responsive to not having connection to the cloud computing system (e.g., network access is unavailable). In some embodiments, a trained machine learning model is developed by the cloud computing system and is then deployed to the client device (e.g., making internet access unnecessary, applying the trained machine learning model without network access. In some embodiments, an additional node (e.g., computing device, processing device, gateway, etc.) on the thread layer (e.g., wireless mesh network) is capable of collecting runtime data (e.g., sensor data) related to client devices (e.g., end devices, gateway, driver, etc.) locally and the collected runtime data is used to develop adaptable machine learning models without access to the cloud computing system via a network.

In some embodiments, at least a portion of the sensor data available at a client device (e.g., end device, gateway, driver, etc.) may not be available to the cloud computing system. For example, under normal operation, the client device may receive a higher temporal resolution of sensor data (e.g., one sample every second) and the cloud computing device may receive a lower temporal resolution of sensor data (e.g., one sample every 15 seconds, receive from the client device). In some embodiments, the machine learning model is trained with exemplary sensor data sampled at a high temporal resolution. For example, the machine learning model may be trained during a training operation when the client device transmits a higher temporal resolution of sensor data to the cloud computing system. In another example, the machine learning model may be trained by the client device based on the higher temporal resolution of sensor data. The machine learning model trained with higher temporal resolution may be used by the client device (e.g., end device, gateway, driver, etc.). The higher temporal resolution data may be capable of detecting device issues which would not be detectable with the lower temporal resolution available in the cloud computing system under normal operation.

FIG. 1 is a block diagram of an electrochromic window system 100 (e.g., smart window system) that provides control (e.g., automated control, corrective control, or the like) of an electrochromic device, according to one embodiment. Corrective control may include one or more of detection (e.g., hardware failure detection, software error detection, defect detection, physical property detection, or the like), prediction (e.g., failure prediction, error prediction, lifespan prediction, or the like), corrective actions (e.g., due to detection and/or prediction), or the like. The electrochromic window system 100 includes a first cabinet 108 in which a first distributed energy management system (EMS) 102, a first set of drivers 104, and a gateway 106 are located. In an alternate embodiment, the drivers 104 may be integrated drivers where one or more drivers are integrated into the EC windows. Each of the set of drivers 104 is coupled to an individual one of a set of electrochromic (EC) windows 130 (e.g., electrochromic devices). Alternatively, other electrochromic devices can be driven by the set of drivers 104. The set of drivers 104 are coupled to the set of EC windows 130 via power cables 148 and control wires. The cabinet 108 can be a standard size, such as 28", 42", or 60". The cabinet 108 can be located in proximity to the EC windows 130 or located away from the EC windows 130, such as up to 300 feet. The cabinet 108 can be located in a location that reduces wiring costs. Between each driver and EC window there may be one or more power cables 148 coupled to an anode of the EC window and one or more power cables 148 coupled to a cathode of the EC window. There may be two control wires for sensing the voltage of the EC window (referred to herein as sense voltage or Vsense) and two wires for sequestration operations, as described herein. In one embodiment, each driver of the set of drivers 104 can supply up to 8 amps to each EC window of the set of EC windows 130. An external power supply 132 is coupled to provide external power to the distributed EMS 102, the set of drivers 104, and the gateway 106 within the cabinet 108. For example, 16 AWG 2 conductor plenum cables can provide lower voltage (48V) or higher voltage (110-240V) to the cabinet 108. The external power supply 132 can be located in proximity to the cabinet 108 or farther away from the cabinet 108, such as up to hundreds of feet or up to 1000 feet. In some embodiments, the external power supply 132 is configured to supply less than 25% of a maximum power used by the set of EC windows 130 during switching of one or more of the set of EC windows 130. Additional external power supplies can be used to power the components in the cabinet 108. The external power supply 132 may be a conventional power supply connected to the power grid or it may be a building battery such as the residential batteries built by Tesla (the Powerwall battery) or LG Chem's RESU battery that obtain energy from a source such as on-site solar energy cells. The external power supply 132 may be a combination of the power grid and a building battery.

Although portions of the present disclosure describe the electrochromic window system 100 in relation to a distributed EMS, the electrochromic window system 100 may include one or more different types of power sources (e.g., a battery, a local power source inside of a driver, a multi-device boost power supply, etc.) in addition to or instead of the distributed EMS.

In some embodiments, a driver for an EC window may be integrated into the EC window itself in either the frame of the window or in the IGU or LGU of the EC window.

Each EC window may include an electrochromic panel (e.g. glass or film) that can change transmissivity with the application of electric current and voltage. The change of transmissivity typically relies on a reversible oxidation of a material. Electrochromic units can darken at the press of a button (e.g., user input via tint selector 120 or 128, dashboard web app 140, dashboard mobile app 142, etc.) or in response to an automatic triggering event and are also often used in automobile rearview mirrors to reduce reflective glare. In some embodiments, upon receiving user input via the tint selector 120 to tint a first EC window associated with a first driver, the tint selector 120 may transmit instructions to the first driver and the first driver may control the tint level of the EC window. In some embodiments, upon receiving user input via a user device to tint a first EC window associated with a first driver, dashboard web app 140 or dashboard mobile app 142 (e.g., executing on the user device) may transmit the user input to the cloud computing system 110, the cloud computing system 110 may transmit the user input to the gateway 106, and the gateway 106 may transmit the user input to the first driver to cause the first driver to control the tint level of the first EC window. The different transmissivities of the EC windows may be referred to as tint levels (e.g., 0% tint level is 65% transmissivity, 50% tint level is 21% transmissivity, 100% tint level is 2% transmissivity, etc.).

In some embodiments, one or more power sources (e.g., the distributed EMS, a battery, a local power source inside of a driver, a multi-device boost power supply, etc.) may provide additional power (e.g., boost power) to an electrochromic device (e.g., EC window 130) that can be supplied by a main power supply. The one or more power sources may support a varied number of EC windows based on geometry and size of the EC windows, how often the EC windows are tinted, as well as how low other power sources (e.g., the batteries of the distributed EMS 102) can be discharged.

Each power source (e.g., distributed EMS 102) may supply power to the set of drivers 104 according to a power state of the set of EC window 130, as well as the power state of other power sources (e.g., multi-device boost power supply 208). For example, the distributed EMS 102 can supply a first amount of power to the set of drivers 104 from an external power supply interface in an idle state of the set of EC windows 130. Alternatively, the distributed EMS 102 does not supply power to the set of EC windows 130 in the idle state. In some embodiments the idle power level of an EC window may be zero, for example when the type of EC device used only requires power to switch from one optical transmission state to another optical transmission state. The power state information (e.g., idle state, tinted state, transitioning between states, etc.) may be provided to the gateway 106 and may be shared with the cloud computing system 110.

The additional power provided by the one or more power sources can enable fast and uniform switching in a variety of conditions, and in particular when the EC window 130 includes a gradient conductive layer.

An EC window 130 including a gradient transparent conductive layer can have very fast switching speed (e.g., less than 5 minutes, or less than 10 minutes) as well as uniform transitions between states (e.g., where the clear state, dark state and all tinted states have delta E across the area of the panel less than 10) by including one or more gradient transparent conductive layers in each EC device or panel. The term "gradient transparent conductive layer" refers to an electrically conducting layer with spatially varying sheet resistance, or resistance to current flow substantially parallel to a major surface of the layer, that varies as a function of position within the electrically conductive layer. The gradient transparent conductive layer or layers also enable the driving of an EC window 130 incorporating such a layer at much higher voltages so that high amounts of power are required initially to drive fast switching. The gradient transparent conductive layer may be a patterned or graded transparent conductive oxide (TCO) such as indium titanium oxide and tantalum tin oxide. In other embodiments, the distributed EMS 102 can be used in connection with drivers that drive other types of electrochromic devices. Additionally, the distributed EMS can be used to drive multi-panel electrochromic windows that include more than one EC window 130 connected in series or parallel. A multi-panel electrochromic window may be one where the EC windows 130 are stacked over one another to provide very low transmissivity of light through the devices, for example less than 1% transmissivity of light or less than 0.1% transmissivity of light. Alternatively the multi-panel electrochromic windows may be "tiled" adjacent to one another such that more than one EC window 130 is laminated to a carrier glass substrate to form larger sized windows. In another embodiment a single driver may be used to drive multiple electrochromic windows that may be in a group of electrochromic windows. For example a single driver may drive two or more electrochromic windows.

The gateway 106 is operatively coupled to a cloud computing system 110. A cloud computing system refers to a collection of physical machines (e.g., server devices), that host applications providing one or more services to multiple components (e.g., gateway 106, sensor hub 126, drivers 104, distributed EMS 102, user devices executing dashboard mobile app 142 or dashboard web app 140, etc.) via a network. In some implementations, the applications hosted by cloud computing system 110 may provide services (e.g., scheduling, viewing, remote management, automated control, etc.) to users accessing the cloud computing system 110 via a network. The applications may allow users to manipulate (e.g., access, create, edit, store, delete, share, collaborate, print, etc.) electronic documents (e.g., schedules, rules, configurations, automated control, etc.). The cloud computing system 110 may include one or more server devices and one or more data stores. The cloud computing system 110 may include a control module 220 (e.g., corrective control module 222, automated control module 224, see FIGS. 2A-B). The control module 220 may include one or more applications, one or more server devices, etc. The gateway 106 can be hardwired (e.g., via Ethernet) to a network device of a local area network, to gain access to a private or public network to access the cloud computing system 110. The gateway 106 can communicate with the cloud computing system 110 over Cat 5 wiring using the TCP/IP protocol with TLS (SSL) for secure communications. The gateway 106 can communicate with the cloud computing system 110 using communications, such as using IPV4, IPv6, or Transport Layer Security (TLS) networking protocols. The cloud computing system 110 can provide control logic, automated control (e.g., cause tint level of the EC windows 130 to be set to avoid glare), and configuration for the electrochromic window system 100. The cloud computing system 110 may receive information (e.g., via one or more application programming interfaces (APIs), weather information, etc.) for providing automated control, etc. The cloud computing system 110 may determine which EC windows 130 each device (e.g., tint selector 120 or 128, gateway 106, etc.) and each application (e.g., dashboard mobile app 142, dashboard web app 140, etc.) is authorized to view and/or control and the priority of control. For example, the cloud computing system 110 may determine that the tint selector 120 is authorized to control EC windows 130 that are connected to drivers 104. In another example, the cloud computing system 110 may determine that the dashboard mobile app 142 logged in by a first user is authorized to view and control only the first window of the EC windows 130. During configuration (e.g., commissioning, set-up by an administrator), the cloud computing system 110 may receive instructions of which users and which devices are authorized to control which EC windows 130. In some embodiments, the cloud computing system 110 may authorize access by components (e.g., tint selectors 120 and 128, gateway 106, etc.) to a wireless mesh network (e.g., during commissioning or set-up) and once authorized, subsequent access of the wireless mesh network is not dependent on further authorization (e.g., components are authorized during commissioning or set-up and do not need further authorization to continue accessing).

In some embodiments, the cloud computing system 110 may use machine learning to provide control of the EC windows 130. In some embodiments, the cloud computing system 110 may include a broker module to receive data from the gateway 106, sensor hub 126, etc. (e.g., for providing corrective control, for providing automated control, for providing data visibility) and to transmit data to other gateways 106. In some embodiments, control of the EC windows 130 may be distributed over the cloud computing system 110 and the gateway 106. For example, the cloud computing system 110 may provide settings files (e.g., a schedule, rules, etc.) to the gateway 106 and the gateway 106 may control the EC windows 130 based on the settings files. The cloud computing system 110 may send additional instructions to the gateway 106 to deviate from the settings files in controlling the EC windows 130 (e.g., responsive to the cloud computing system 110 receiving user input via a dashboard mobile app 142, sensor data via the sensor hub 126, the gateway 106 may provide a conduit for control of the EC windows 130, etc.).

The cloud computing system 110 can provide automation algorithms, data analytics, user management, security protocols, and the like. The cloud computing system 110 can provide corrective control, extensive system health monitoring, proactive troubleshooting, as well as provide third-party integration without complicated on-site technical support. The cloud computing system 110 can provide a system dashboard to a dashboard web app 140 on a desktop computer, a dashboard mobile app 142 on a personal computing device, or both. The dashboard web app 140 and the dashboard mobile app 142 can be used to monitor or control the electrochromic window system 100. The dashboard web app 140 and the dashboard mobile app 142 are applications that may be executed on one or more user devices. For example, the dashboard mobile app 142 may execute on a mobile user device, such as a smart phone or a tablet. The dashboard web app 140 may execute on a desktop, laptop, etc. The dashboard web app 140 or the dashboard mobile app 142 (executing on a user device) may receive user input (e.g., selection of one or more EC windows and a tint level) via the user device and may transmit the user input to the cloud computing system 110. Responsive to determining that the user input is a request to view information (e.g., monitor current status of components, current mode of EC windows 130, etc.), the cloud computing system 110 may retrieve the information and transmit the information to the user device to cause the dashboard web app 140 or dashboard mobile app 142 to display the requested information. Responsive to determining that the user input is a request to change operation of one or more components of the electrochromic window system 100, such as a request to tint a first EC window associated with a first driver, the cloud computing system 110 may transmit the user input to the gateway 106, the gateway 106 may transmit the user input to the first driver, and the first driver may control the tint level of the first EC window based on the user input.

The cloud computing system 110 can also interact with other devices or networks, such as with a second cloud computing system 146, as illustrated in FIG. 1, that communicates with a voice-controlled device 144. For example, the voice-controlled device 144 may receive audible commands from a user to control or get a report of the electrochromic window system 100. The dashboard web app 140 and the dashboard mobile app 142 can communicate with the cloud computing system 110 using the TCP/IP protocol with TLS (SSL) and using encryption and authentication for secure communications. The cloud computing system 110 can include a microservice architecture (e.g., application architecture) that is exposed through APIs to manage interaction with onsite components, such as the gateways, drivers, and tint selectors. The cloud computing system 110 can eliminate complicated onsite networking requirements, as the external control occurs through the APIs. The cloud computing system 110 can provide centralized data aggregation from all deployments to facilitate automation and analytics. The centralized data aggregation of the cloud computing system 110 may also include data from the manufacturing, testing, and assembly of the EC Windows 130 and any associated hardware of the electrochromic window system 100 (e.g. drivers 104, gateways 106, etc.). The cloud computing system 110 can leverage various authentication and authorization technologies to secure site access. The cloud computing system provides a robust platform that facilitates on-demand load scaling and health monitoring. The cloud computing system 110 can also provide a better path for onsite workload migration, backed by a robust central cloud store.

As described above, the gateway 106 communicates directly with the cloud computing system 110 through secured channel(s). The gateway 106 communicates with the cloud computing system 110 on behalf of the set of drivers 104 and the distributed EMS 102. The gateway 106, the set of drivers 104, and the distributed EMS 102 communicate with each other over wireless connections, such as over a secure thread wireless network. For example, each of these components can communicate using IEEE 802.15.4, 2.4 GHz, IPv6 mesh network routing (thread). These communications can be encrypted with 128-bit AES encryption. Alternatively, other mesh networks can be used, as well as other frequencies, and encryption techniques.

It should be noted that, after the drivers and the distributed EMS are configured via the gateway, the distributed EMS and driver behavior is not dependent on the gateway for safe operation. That is, the gateway can be disconnected and the drivers will not drain the batteries of the distributed EMS.

As illustrated in FIG. 1, the electrochromic window system 100 may include additional devices, such as a tint selector 120, an occupancy sensor 122, an occupancy sensor interface and thread range extender 138, a building sensor 124 (e.g., roof mounted irradiance sensor), and a sensor hub 126.

The sensor hub 126 can be powered by an external power supply 136 and can be hardwired to the local area network, much like the gateway 106.

The occupancy sensor interface, thread range extender 138, and occupancy sensor 122 can be powered by an external power supply and can send or receive signals to or from a lighting system or a building management system (BMS). The tint selector 120 and occupancy sensor interface and thread range extender 138 can communicate with other devices on the wireless mesh network.

The tint selector 120 can be a device that is mounted on a wall where a user can activate a transition of one or more EC windows 130. The tint selector 120 can be mounted or otherwise disposed in a building having the EC windows 130 to permit user control of one or more EC windows 130 (e.g., the set of EC windows). The tint selector 120 can be programmed to be part of group of EC windows (e.g., a set of windows that are to be set at the same tint level, e.g., all EC windows in the group tinted 50%). That is the tint selector 120 can be associated with the set of drivers 104 and the gateway 106. Alternatively, the tint selector 120 can be associated with a scene of one or more EC windows. Upon receiving user input (e.g., via the tint selector 120) for EC windows to be tinted in a scene, one or more first EC windows of the scene are to be tinted at a first tint level and one or more second EC windows of the scene are to be tinted at a second tint level (e.g., all EC windows of the scene are to be tinted 100% except for one EC window of the scene that is to be tinted 50%). Upon receiving user input, the tint selector may transmit (e.g., multicast) a signal to the corresponding drivers to cause the EC windows to change tint level. The tint selector may also transmit the user input to the gateway 106 to cause the gateway to transmit the user input to the cloud computing system 110.

The electrochromic window system 100 can include one or more additional tint selectors, such as illustrated in FIG. 1 by a second tint selector 128 that is also wirelessly coupled to the wireless mesh network. The second tint selector 128 can be associated with the same group or scene as the tint selector 120. Alternatively, the second tint selector 128 can be associated with a different group or a different scene as the tint selector 120.

In a further embodiment, the electrochromic window system 100 can include one or more cabinets, such as illustrated in FIG. 1 with a second cabinet 118. The second cabinet 118 can include a second distributed EMS 112 and a second set of drivers 114. In some cases, the second cabinet 118 does not include a second gateway and the gateway 106 manages the second set of drivers 114 as well. An external power supply 134 is coupled to provide external power to the second distributed EMS 112 and the second set of drivers 114 within the second cabinet 118. For example, 16 AWG 2 conductor plenum cables can provide lower voltage (48V) or higher voltage (110-240V) to the second cabinet 118. The external power supply 134 can be located in proximity to the second cabinet 118 or farther away from the second cabinet 118, such as up to 350 feet. In other cases, more than two cabinets may be used. It should also be noted that additional external power supplies can be used to power the components in the cabinet 108 and the second cabinet 118.

Each component of the electrochromic window system 100 can be designed to automatically obtain critical operating data from the cloud computing system 110 to avoid a single failure requiring significant maintenance downtime. Although various components are illustrated in FIG. 1, in other embodiments, the electrochromic window system 100 may include more or less components than as illustrated in FIG. 1.

Figure 2A:
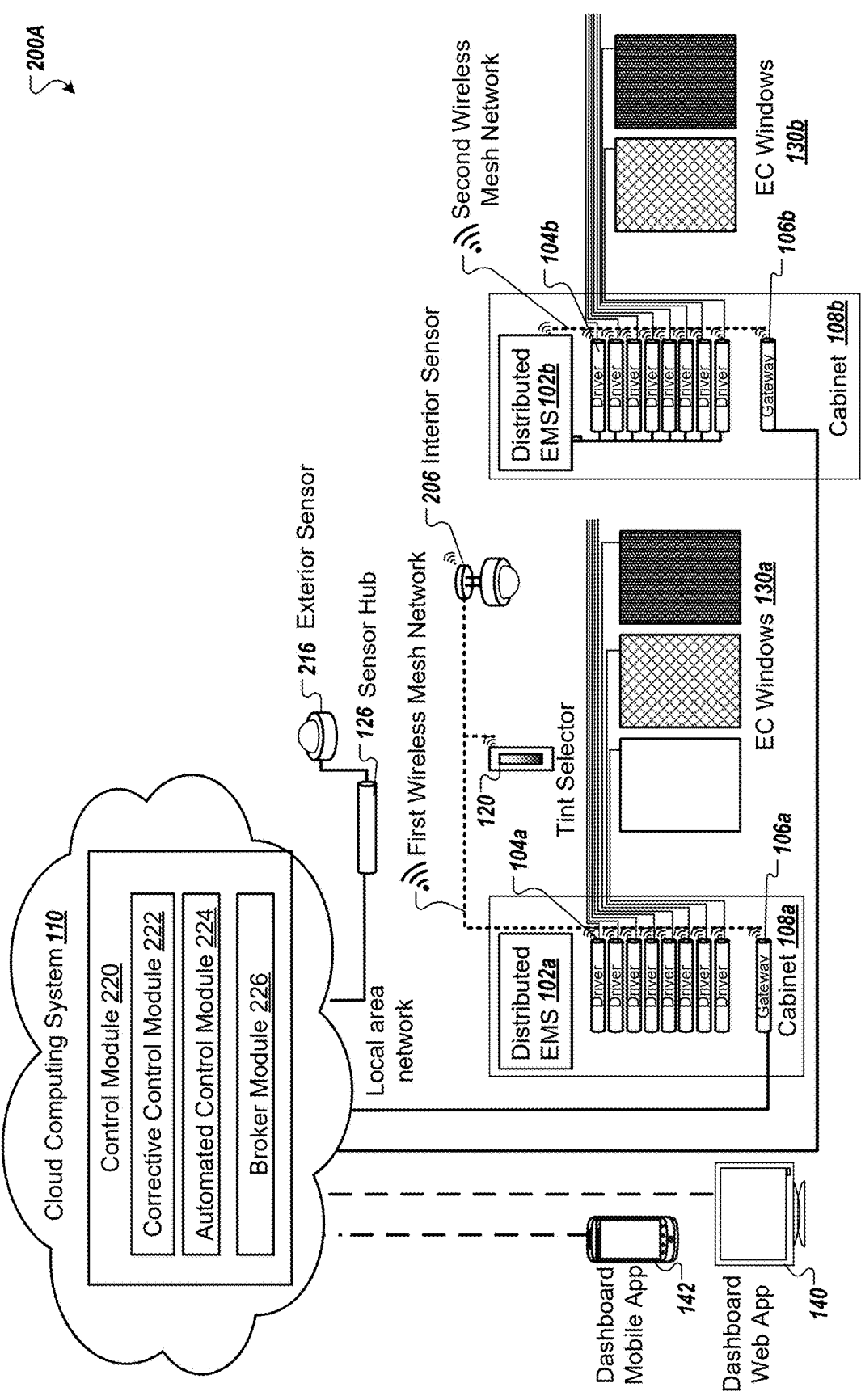
FIG. 2A is a block diagram of an electrochromic window system including a control module, according to certain embodiments.

FIG. 2A is a block diagram of an electrochromic window system 200A (e.g., smart window system) including a control module 220, according to certain embodiments. The control module 220 may include one or more of a corrective control module 222, an automated control module 224, or a broker module 226. The corrective control module 222 may be used for one or more of detection (e.g., hardware failure detection, software error detection, defect detection, physical property detection, or the like), prediction (e.g., failure prediction, error prediction, lifespan prediction, or the like), corrective actions (e.g., due to detection and/or prediction), or the like. Components with the same reference number as those in FIG. 1 may include similar or the same functionalities as those described in relation to FIG. 1. One or more modules, functionalities, data stores, etc. of cloud computing system 110 may be provided by a third party service. In some embodiments, the broker module 226 may be provided by a third party (e.g., a third party on-demand cloud computing platform provider). In some embodiments, the broker module 226 is provided by the same entity that provides the corrective control module 222 and/or automated control module 224. In some embodiments, the corrective control module 222 and/or automated control module 224 is a single module that operates on the cloud computing system 110. In some embodiments, the corrective control module 222 and/or automated control module 224 includes two or more modules (e.g., two or more microservices, two or more applications). In some embodiments, the corrective control module 222 and/or automated control module 224 may include one or more applications and one or more servers.

The electrochromic window system 200A may include the cloud computing system 110 and components including one or more of drivers 104, one or more gateways 106, EC windows 130, distributed EMS 102, tint selector 120, interior sensors 206, sensor hub 126, exterior sensors 216, etc. The cloud computing system 110 may include the corrective control module 222, automated control module 224, and the broker module 226. The corrective control module 222 and/or automated control module 224 may identify, send instructions to, and receive data from the components of the electrochromic window system 200A.

The cloud computing system 110 is coupled to one or more gateways 106, a sensor hub 126, a dashboard web app 140, and a dashboard mobile app 142. Each gateway 106 may be coupled via a corresponding wireless mesh network to drivers 104, interior sensors 206 (e.g., occupancy sensor 122, occupancy sensor interface and thread range extender 138, etc.), one or more tint selectors 120, and the distributed EMS 102. The gateway 106 may include characteristics of one or more of a hub, proxy, or aggregator. A sensor hub 126 may be coupled to one or more exterior sensors 216. The drivers 104, distributed EMS 102, tint selector 120, and interior sensors 206 may be disposed proximate the gateway 106 (e.g., within the building, within range of the wireless mesh network, etc.). The interior sensors 206 may include one or more of interior light sensors, a sensor on a window to collect EC window 130 transmittance data, sensors to collect photographic data from interior of building, occupancy sensors, etc. The exterior sensors 216 may be disposed proximate sensor hub 126 (e.g., proximate the roof of the building, on the roof, proximate the edge of the roof, etc.). The exterior sensors 216 may include one or more of light sensors on the sides of buildings, temperature and/or humidity sensors, sensors (or cameras) to collect photographic data of cloud cover (or irradiance), irradiance sensor, rooftop pyranometer sensor (e.g., measure total global irradiance, measure diffuse horizontal irradiance (DHI), calculate direct normal irradiance, include non-visible spectrum), etc. DHI may refer the terrestrial irradiance received by a surface (e.g., horizontal surface) which has been scattered or diffused by the atmosphere. DHI may be a component of global horizontal irradiance which may not come from the beam of the sun (e.g., beam may be about a 5-degree field of view concentric around the sun).

Each gateway 106 may be coupled, via a corresponding wireless mesh network, to corresponding drivers 104 that control corresponding EC windows 130. For example, gateway 106a may be coupled, via a first wireless mesh network, to drivers 104a that control EC windows 130a and gateway 106b may be coupled, via a second wireless mesh network, to drivers 104b that control EC windows 130b (e.g., the EC windows 130 span more than one wireless mesh network). The drivers 104a may be coupled to a gateway 106a and drivers 104b to gateway 106b because of capacities (e.g., capacity of each gateway 106, cabinet 108, distributed EMS 102, wireless mesh network, etc.), length of cables, etc.

In some embodiments, the corrective control module 222 may receive sensor data. At least a portion of the sensor data (e.g., image data, temperature data, electrical current data, voltage data, etc.) may be associated with directing a current tinting state of an EC window 130 to correspond to a first tint level (e.g., at different points in time after the directing of the current tinting state of the EC window to correspond to a first tint level). At least a portion of the sensor data (e.g., impedance data, acoustic data, image data, vibration data, temperature data, humidity data, etc.) may not be based on directing change of tinting state of the EC window 130 (e.g., may be received during transportation and/or after stages of manufacturing or installation). The corrective control module 222 may cause a corrective action based on the sensor data.

In some embodiments, the corrective control module 222 may transmit instructions (e.g., via broker module 226) to a corresponding gateway 106 and the gateway 106 may instruct the corresponding driver 104 to change the tint level of a corresponding EC window 130 based on the instructions. The gateway 106 may also instruct the driver 104 and/or one or more sensors to generate sensor data during and/or after the changing (e.g., transition) of the tint level and to provide the sensor data to the gateway 106 based on the instructions. The corrective control module 222 may determine, based on the sensor data, whether a corrective action is to be performed. The determination of whether a corrective action is to be performed may be based on a detection (e.g., of a hardware failure, of a software error, of a defect, of a physical property, etc.) or a prediction (e.g., of a hardware failure, of a software error, of a lifespan) by the corrective control module 222.

The automated control module 224 may transmit tint instructions (e.g., via broker module 226) to a corresponding gateway 106 and the gateway 106 may instruct the corresponding driver 104 to change the tint level of a corresponding EC window 130 based on the instructions.

Although aspects of the disclosure refer to hardware failure detection, prediction, and correction of an EC window 130, the same methods and systems may be applied to other components of the electrochromic window system. Sensor data can be collected and associated with manufacturing and/or installation of components of the electrochromic window system (e.g., EMS 102, driver 104, gateway 106, sensor hub 126, or the like). Sensor data may be collected and associated with the usage of components of the electrochromic window system (e.g., to change the tinting state of an EC window). The control module 220 may determine whether a corrective action is to be performed (e.g., during manufacturing, installation, and/or usage) based on the sensor data. For example, the control module 220 may collect sensor data associated with manufacturing and/or installation of multiple EMS. The control module 220 may determine that one or more EMS are abnormal (e.g., have poor battery life). The control module 220 may determine the cause of the anomaly based on the sensor data (e.g., inputting the sensor data and the performance data in a trained machine learning model) to determine whether a corrective action is to be performed for other EMS (e.g., generate predictive data for other EMS). The corrective action can include an indication that an EC window 130, a distributed EMS 102, gateway 106, or any other hardware of the system 200A is defective. In one embodiment, the corrective action can include providing additional charge to an EC window (e.g., when a leaky panel is detected).

Figure 2B:
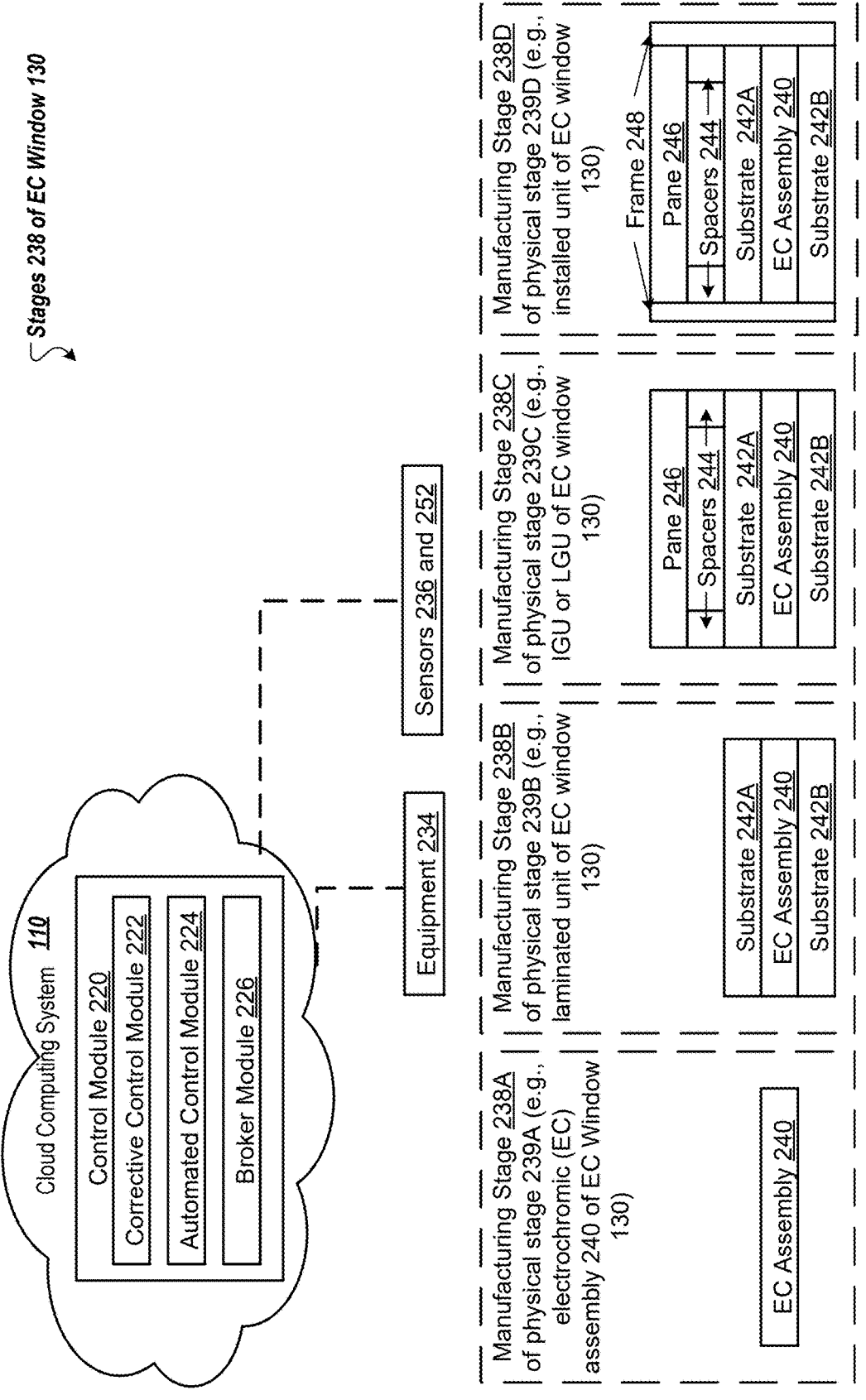
FIG. 2B is a block diagram of manufacturing stages of an electrochromic window, according to certain embodiments.
Figure 2C:
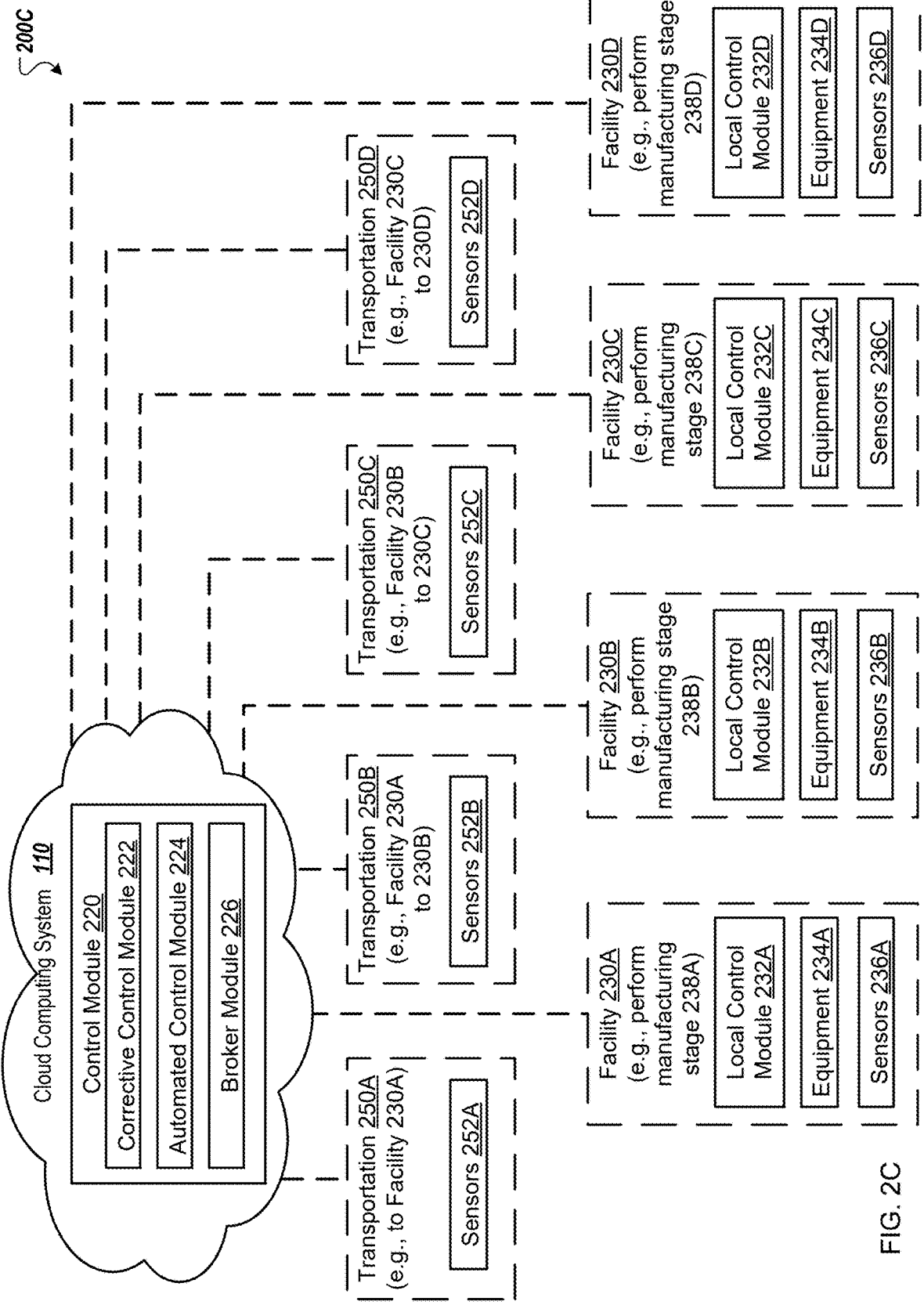
FIG. 2C is a block diagram of a manufacturing system for producing electrochromic windows, according to certain embodiments.

FIG. 2B is a block diagram of manufacturing stages 238 of an EC window 130, according to certain embodiments. FIG. 2C is a block diagram of a manufacturing system 200C (e.g., smart window manufacturing system) for producing EC windows 130 (e.g., physical stages 239 of EC windows 130), according to certain embodiments. FIGS. 2B-C include sensors 236 associated with performing manufacturing stages 238 (e.g., to produce physical stages 239 of EC windows) and sensors 252 associated with transportation 250 (e.g., of materials and/or physical stages 239). Corrective control module 222 may use sensor data from sensors 236 and 252 to perform a detection (e.g., of a hardware failure, of a software error, of a defect, of a physical property, etc.) or a prediction (e.g., of a hardware failure, of a software error, of a lifespan, etc.) to determine whether a corrective action is to be performed.

Referring to FIG. 2B, the cloud computing system 110 may include a control module 220. The control module 220 may include a corrective control module 222, automated control module 224, and broker module 226. The cloud computing system 110 may be coupled to equipment 234 (e.g., for producing and installing EC windows 130) and sensors 236 and/or 252 for receiving sensor data (e.g., see FIG. 2C). The corrective control module 222 may cause the equipment 234 to produce physical stages 239 of EC windows 130 via the corresponding manufacturing stages 238 of the EC windows 130 (e.g., cause equipment 234 to perform manufacturing stages 238 that include one or more manufacturing processes and/or one or more installation processes). The corrective control module 222 may collect sensor data from the sensors 236 and/or 252 associated with one or more of the manufacturing stages 238 and/or physical stages 239 of the EC window 130 (e.g., to verify quality, to determine whether a corrective action is to be performed, to cause corrective action, or the like).

Manufacturing stage 238A may be associated with producing a physical stage 239A including an electrochromic (EC) assembly 240. The EC assembly 240 may include one or more transparent substrates such as glass or flexible film, one or more of an ion conductor layer, a cathode layer, an anode layer, one or more transparent conductive layers such as a TCO (transparent conductive oxide), an anode bus bar coupled to the anode layer, a cathode bus bar coupled to the cathode layer, or the like.

Manufacturing stage 238B may be associated with producing a physical stage 239B including a laminated unit. The laminated unit may include one or more substrates 242 (e.g., carrier glass, carrier plastic, transparent substrate) disposed on the EC assembly 240. In some embodiments, the EC assembly 240 is disposed on a substrate 242B and a substrate 242A is disposed on the EC assembly 240.

Manufacturing stage 238C may be associated with producing a physical stage 239C including an integrated glass unit (IGU) or a laminated glass unit (LGU). The IGU or LGU may include one or more spacers 244 disposed on the laminated unit (e.g., substrate 242) and a pane 246 (e.g., outer pane, inner pane, glass) disposed on the one or more spacers 244. A gap between the pane 246 and the substrate 242A may be filled with a gas (e.g., argon, nitrogen, dry air, or other gas). The one or more spacers 244 and/or one or more seals may seal the gas within the EC window 130. The gas may provide insulation for and/or avoid condensation within the EC window 130. In some embodiments, physical stage 239C includes a cable harness (e.g., pigtail) attached to the IGU or LGU (e.g., attached to the EC assembly 240, manufacturing stage 238C may include attaching one or more portions of the cable harness to the IGU or LGU). An IGU may include insulation (e.g., insulating gas, spacer, etc.) and may be installed in an exterior wall of a building. An LGU may not include insulation (e.g., insulating gas, spacer) and may be installed in an interior space of a building (e.g., in a conference room, between a first temperature-controlled space and a second temperature-controlled space).

Manufacturing stage 238D may be associated with producing a physical stage 239D including an installed unit. The installed unit may include the IGU or LGU and a frame 248. The frame 248 may be disposed around the perimeter (e.g., on lateral sides) of the IGU or LGU. In some embodiments, the frame 248 may be built in the building and the IGU or LGU may be installed in the frame 248. In some embodiments, the IGU or LGU may be installed in the frame 248 and the framed IGU or LGU may then be installed in the building. The IGU or LGU may be installed in a façade, exterior wall, interior wall, or the like of a building.

In some embodiments, one or more of the manufacturing stages 238 are associated with a cable (e.g., pigtail) being connected to the EC assembly 240 for coupling the EC window 130 to a driver for changing of the tinting states. The building installation order details may specify a specific electrical connection configuration for the EC window 130 which may include one or more of a cable location (e.g., location of pins in EC window 130 for connection to cable), cable length, cable routing from the EC window 130 to the driver, or the like. A three-dimensional (3D) model of the building may indicate specific cable routing due to clearances between an EC window 130 and other objects (e.g., cables are to be routed in a channel between two EC windows 130, cable is to be routed from a top side of the EC window 130 due to insufficient spacing between EC windows 130 for the cable, etc.).

In some embodiments, the sensors 236 and 252 are to provide sensor data associated with each of the physical stages 239 to control module 220 for performing of quality control during manufacturing as well as corrective control for hardware failures occurring after an EC window 130 is installed (e.g., determining whether a corrective action is to be performed). In some embodiments, the sensor data from sensors 236 and/or 252 are to be stored as historical sensor data for training a machine learning model for performing quality control and corrective control (e.g., determining whether a corrective action is to be performed for future EC windows 130).

Referring to FIG. 2C, the control module 220 may include one or more of a corrective control module 222, an automated control module 224, or a broker module 226. Components with the same reference number as those in FIG. 1, FIG. 2A, and/or FIG. 2B may include similar or the same functionalities as those described in relation to FIG. 1, FIG. 2A, and/or FIG. 2B.

The electrochromic device manufacturing system 200C may include one or more facilities 230 (e.g., manufacturing facilities, installation site, etc.) that each produce one or more physical stages 239 of an EC window 130 (e.g., perform one or more manufacturing stages 238 of an EC window 130). In some embodiments, each physical stage 239 of the EC window 130 may be produced (e.g., built, installed, generated, manufactured, assembled, or the like) at a different facility 230 (e.g., each manufacturing stage 238 takes place at a different facility 230). Although four manufacturing stages 238 and four facilities 230 are illustrated, more or less manufacturing stages 238 and/or facilities 230 may be used. In some embodiments, one or more manufacturing stages 238 of the EC window may be performed at the same facility 230. For example, one facility 230 may perform the processes corresponding to manufacturing stages 238A-C of the EC window 130 and another facility 230 may perform the processes (e.g., framing, installation) corresponding to manufacturing stage 238D of the EC window 130.

Transportation 250 may be used to transport materials and/or physical stages 239 to and/or from different facilities 230. Transportation 250 may be via one or more of water (e.g., boat), air (e.g., plane), land (e.g., automobile, delivery truck, train, forklift, manual transportation, etc.), or the like. Each transportation 250 may include one or more sensors 252 (e.g., temperature sensor, humidity sensor, vibration sensor, humidity sensor, chemical substrate detection sensor, maximum impact sensor, etc.).

Each facility 230 may include a local control module 232, equipment 234 (e.g., manufacturing equipment, installation equipment, or the like), and one or more sensors 236. The control module 220 may cause one or more physical stages 239 of the EC windows 130 to be produced and/or transported in the order that the EC windows 130 are to be installed (e.g., cause performance of manufacturing stages 238 of EC windows 130 in the order that the EC windows 130 are to be installed, cause loading of EC windows 130 in transportation 250 in the order they are to be installed, etc.). The order of the EC windows 130 may be determined from one or more of the 3D model of the building, order details, etc. The control module 220 may collect data (e.g., sensor data from sensors 236 and/or 252) associated with production and/or transportation of one or more physical stages 239 of the EC windows 130.

The control module 220 and/or local control module 232 may cause collection of sensor data for each facility 230, each manufacturing stage 238, each physical stage 239, and/or each transportation 250. The control module 220 and/or local control module 232 may use the sensor data for quality testing for each facility 230, each manufacturing stage 238, each physical stage 239, and/or each transportation 250. The control module 220 and/or local control module 232 may use the sensor data and/or the result of the quality testing for future hardware failure detection, prediction, and correction. The quality testing may include one or more of material procurement, incoming inspection (e.g., incoming quality control (IQC)), in-process quality, final quality check, product labeling, outgoing quality inspection (e.g., outgoing quality control (OQC), or the like. The quality testing may include one or more imaging techniques, such as one or more of deflectometry with backlight, polarization, polarization and backlight, dark field (e.g., illumination with flat incident light from all sides), coaxial illumination, collimated frontlight, or collimated backlight. The quality testing may include performing one or more imaging techniques at different tint states of the EC windows 130 for quality control. The quality testing may verify that facilities 230 (e.g., manufacturers) create a quality physical stage 239 of the EC window 130 and that transportation 250 (e.g., transporters) maintains quality physical stage 239 through quality assurance (QA) tests (e.g., "go"/"no go" tests). The control module 220 may allow product tracking and labeling for product delivery (e.g., transportation 250 to the next facility 230) and on-site installation. The control module 220 may provide traceability through cable identifiers and/or carrier glass identifiers. In some embodiments, the control module 220 may specify which EC windows 130 (or physical stage 239 of EC window 130) is assigned to which shipping pallet (e.g., and the order on the shipping pallets).

The control module 220 may receive order details (e.g., advanced system design) for EC windows 130. In some embodiments, the control module 220 receives an order request, generates a 3D model, and determines (e.g., exports) the order details based on the 3D model. In some embodiments, the control module 220 receives the 3D model and determines the order details based on the 3D model (e.g., builds advance system design based on 3D model and model component library). The control module 220 may streamline the design process, enforce system design rules, and improve quality. The control module 220 may generate a bill of materials (BOM) based on the order details. The control module 220 may generate a virtual layout of a customer site based on the order details (e.g., advance system design). The virtual layout of the customer site may be used to configure and/or personalize the site (e.g., with EC windows 130). The control module 220 may determine which EC windows 130 are to be manufactured based on the order details and the current inventory of EC windows 130.

The control module 220 may cause transportation 250 of materials (e.g., physical stages 239 of EC windows 130) and performance by facilities 230 of the different manufacturing stages 238 of the EC windows 130 (e.g., based on the order details).

The control module 220 may receive sensor data from sensors 252 associated with transportation 250. Sensors 252 may include one or more of temperature sensor, pressure sensor, vibration sensor, humidity sensor, or the like. Control module 220 may compare sensor data (e.g., one or more of temperature measurements, pressure measurements, vibration measurements, humidity measurements, or the like) from sensors 252 to threshold levels. Responsive to the sensor data from one or more of sensors 252 not meeting a threshold value, control module 220 may cause a corrective action. For example, responsive to temperature measurements during transportation 250 exceeding threshold values, control module 220 may cause the corrective action of one or more of providing an alert, discarding the materials being transported, using the materials for a different grade of EC windows 130, testing the materials, or the like.

The control module 220 may receive sensor data from sensors 236 associated with the physical stages 239 of the EC window 130. Sensors 236 may include one or more of a spectrometer, one or more image capturing devices, impedance sensor, acoustic sensor (e.g., ultrasonic acoustic device), temperature sensor, or the like. In some embodiments, the sensor data corresponds to a finished physical stage 239 (e.g., an EC assembly 240, a laminated unit, an IGU, an LGU, an installed IGU or LGU, etc. of the EC window 130. In some embodiments, the sensor data corresponds to a point in time during performance of a manufacturing stage 238 of the EC window 130 (e.g., during production of physical stage 239). In some embodiments, the sensor data corresponds to one or more tinting states of the physical stage 239 of the EC window 130. In some embodiments, the sensor data corresponds to one or more points in time (e.g., during and/or after the changing or transitioning of the tinting state). Control module 220 may compare sensor data (e.g., one or more of spectrometer data, image data, impedance data, acoustical data, temperature data, or the like) from sensors 236 to threshold levels. Responsive to the sensor data from one or more of the sensors 236 not meeting a threshold value, control module 220 may cause a corrective action. For example, responsive to image data of a solder joint not meeting a threshold value, the control module 220 may cause a corrective action of re-doing the solder joint to be performed.

In some embodiments, tension is to be provided between a cable (e.g., connected to the physical stage 239 of the EC window 130, connected to the EC assembly 240) and the physical stage 239 (e.g., representative of a manual pulling action associated with installation) prior to testing of the physical stage 239 to determine whether the sensor data indicates a corrective action is to be performed under tension associated with installation.

In some embodiments, instead of or in addition to comparing sensor data (e.g., from sensors 236 and/or sensors 252) to threshold values, the sensor data may be input into a trained machine learning model to determine whether a corrective action is to be performed. In some embodiments, the sensor data (e.g., from sensors 236 and/or sensors 252) may be used to train a machine learning model for determining whether a corrective action is to be performed for other EC windows 130. In some embodiments, sensor data (e.g., from sensors 236 and/or sensors 252) associated with EC windows that have anomalies (e.g., reduced lifespans, defects, etc.) and/or that do not have anomalies may be analyzed to determine ranges of sensor data values (e.g., determine the threshold values) for which anomalies are predicted and corrective actions for EC windows 130 associated with the ranges of sensor data values.

In some embodiments, the control module 220 may test automation of controlling tinting state of EC windows 130. The control module 220 may test EC windows 130 for incoming quality control (IQC), in process, and outgoing quality control (OQC).

In some embodiments, one or more sensors may be used to determine whether the EC window 130 (e.g., physical stage 239 of the EC window 130) is correctly tinting (e.g., uniformly changing or transitioning tinting state, uniform color at tinting state, correct tinting speed, correct tinting state, no pin holes of incorrect color during and/or after tinting, or the like). In some embodiments, the current tinting state of a physical stage 239 of an EC window 130 is directed to correspond to a first tinting state (e.g., electric charge is input into the physical stage 239), a first amount of light is provided at a first side of the physical stage 239, and the sensor 236 (e.g., spectrometer) measures the amount of light received at a second side of the physical stage 239 (e.g., during tinting and/or after tinting) to generate sensor data. In some embodiments, the sensors 236 capture one or more images of the EC window 130 (e.g., during tinting and/or after tinting) to generate sensor data. In some embodiments, one or more of the control module 220 or the local control module 232 causes the changing of the tinting state and the measuring of the sensor data.

In some embodiments, the sensors 236 measure electrical data of the EC assembly 240 or EC window 130 during tinting or clearing of the EC assembly 240 or EC window 130 to generate sensor data. The control module 220 may calculate dynamic driver parameters based on the size of the EC window 130. The control module 220 may determine an amount of electric charge (e.g., coulombs) to be input into or removed from the EC window 130 to direct the current tinting state to corresponding to a desired tinting state. The measured electrical data and/or measured optical data (e.g., via image capturing device) may indicate whether the EC window 130 is being driven to corresponding tinting states as directed. In some embodiments, the sensors 236 may test structural integrity of a connection (e.g., flex circuit or other EC assembly wiring, cable, pigtail connection) to verify proper seating between connecting components. In some embodiments, the sensors 236 may perform an electrical cycle test by connecting to the cable coupled to the EC window 130. In some embodiments, the control module 220 may use a driver to perform electrical testing. The sensors 236 may include a driver and/or a component associated with the driver and the sensor data may be an output voltage responsive to a drive voltage, a difference between an expected voltage (e.g., drive voltage, such as zero Volts) and an output voltage, or the like. The electrical data may be used to determine if a wire is broken, if a wire is failing, or the like.

In some embodiments, one or more sensors 236 may be used to determine whether there are defects in solder (e.g., reflow solder, bus bar solder, solder splashes on components of the EC window 130) of the EC window 130. Solder (e.g., reflow solder) may be used to join a connector (e.g., ribbon flex unit) to the EC assembly 240. Solder (e.g., bus bar solder) may be used to join bus bars to layers (e.g., cathode layer, anode layer, electrodes) of the EC assembly 240. If the solder is defective (e.g., bent, cracked, not enough, not connected correctly, shifted during lamination, weak solder connection, or the like), the EC window 130 may not change tinting states correctly. One or more sensors 236 may capture multiple images of the solder connections (e.g., reflow solder, bus bar solder) from different angles. In some embodiments, the images may be captured with polarization (e.g., with one or more lenses). One or more sensors 236 may capture impedance data (e.g., measure voltage over different frequencies at a low current) to determine whether there are defects in soldering. One or more sensors 236 (e.g., temperature sensors, heat camera, etc.) may provide heat data responsive to sending current through the EC window 130 to determine whether portions of the EC window 130 have irregular heating (e.g., to determine whether there are defects in the soldering). One or more sensors 236 may provide acoustic data (e.g., ultrasonic acoustic data) representative of the bonding strength of the interface (e.g., solder joint, bus bar connection, interface bonding) to determine whether there are defects in the soldering. Responsive to certain instances of solder being applied incorrectly (e.g., solder splashes on other components of the EC window 130), the EC window may not function correctly. One or more sensors 236 may provide image data corresponding to the EC window 130 (e.g., portions of the EC window proximate the solder connections) to determine whether any excess solder (e.g., solder splashes) is predicted to affect functionality of the EC window 130.

In some embodiments, one or more sensors 236 may provide sensor data (e.g., captured images of the patterned areas (e.g., laser scriber patterned areas, such as of the gradient laser scriber pattern of the transparent conductive layer) to determine whether there are defects in pattern (e.g., laser scriber patterning of the transparent conductive layers (e.g. TCO) on the transparent substrates (e.g. glass or flexible film) that are part of the EC assembly 240). The patterning of the transparent conductive layer may form a grid or other shapes or the patterning may be isolation etching (e.g., laser scribing or patterning to isolate the bus bars or auxiliary electrode from other components, or the like). Defective etching may cause an electrical short, partial isolation, complete isolation, incorrect resistance patterns in the TCO or EC assembly 240, pattern mismatch (e.g., sizing errors), or the like.

In some embodiments, a sensor 236 may capture image data. Sensor 236 may include one or more of a stationary imaging device, an imaging device that adjusts position to capture images from different angles and/or different locations, an imaging device coupled to an aerial vehicle (e.g., small unmanned aerial vehicle (UAV), micro air vehicle (MAV), a drone), an imaging device located relative to an installed EC window 130, an imaging device disposed on or within an installed EC window 130 (e.g., light sensor or camera embedded in EC window 130), or the like. The control module 220 may cause the sensors 236 to capture images at one or more locations and/or angles relative to the physical stage 239 of the EC window 130. The captured images may be used to train a machine learning model and/or as input into a trained machine learning model. The trained machine learning model may rank the locations and/or angles of capturing of images. The control module 220 may cause the sensors 236 to capture images at the highest ranked locations and/or angles based on the trained machine learning model (e.g., to decrease unnecessary capturing of images, bandwidth required, processor overhead, and energy consumption).

In some embodiments, sensors 236 may capture images (e.g., provide computer vision) of the manufacturing process (e.g., key processes) to detect flaws or other anomalies in the EC assemblies 240 or EC windows 130 that may cause problems in the future. Sensors 236 may capture images of the whole manufacturing process and/or installation process. Sensors 236 may capture images after key stages (e.g., manufacturing processes that are associated with production of defective EC windows 130). Sensors 236 may capture images during testing of the product (e.g., changing of the tinting state) or critical parts before and after manufacturing and/or installation. Quality checks via computer vision may increase yield. Sensors 236 may be cameras that are used in one or more of different light spectrums, different angles, or various lighting conditions. For example, sensors 236 may produce images of the EC assembly to determine whether there are microscopic solder splashes on the EC assembly before it is laminated together in manufacturing stage 238B to warn the manufacturer and prevent the production of a flawed EC window 130.

In some embodiments, one or more sensors 236 may provide sensor data associated with other components of the EC window 130. Sensors 236 may capture image data of the one or more spacers 244 and/or sealant to determine if the IGU or LGU is sealed correctly. Sensors 236 may capture temperature data to determine if a correct amount of insulating gas is sealed correctly in the IGU or LGU (e.g., provides correct amount of insulation.)

In some embodiments, the one or more sensors 236 provide sensor data at specific points in time. A sensor 236 may provide image or light transmissivity data at a specific point in time when the EC window 130 is to be at a specific tinting state (e.g., 2 minutes after electric charge input in the EC window 130, the EC window 130 is to have a specific value of visible transmittance, such as a specific Tvis value or color space value).

Control module 220 may receive other types of data associated with EC windows 130. The other types of data may include material data (e.g., batch number, supplier, date of transportation, date of production, etc.) associated with one or more materials used to produce EC window 130 (or physical stage 239 of EC window 130). The other types of data may include production or installation data (e.g., identifier of facility 230, manufacturer, installer, users associated with production, location of production or installation, or the like).

In some embodiments, as illustrated in FIG. 2C, one or more of the functionalities of the control module 220 may be offloaded to one or more local control modules 232 (e.g.

232A-232D). In some embodiments, the control module 220 and/or the local control module 232 may cause a corrective action. The corrective action may be associated with the equipment 234. A corrective action associated with the equipment 234 (e.g. 234A-234D) may include one or more of replacement of one or more parts of equipment 234, performing preventative maintenance of equipment 234, updating parameters (e.g., manufacturing, installation, process) of equipment 234, interrupting usage of equipment 234, or the like. A corrective action may include generation of a physical label to be associated with the EC Assembly 240 or EC window 130 (e.g., indicative that the EC window failed to pass a quality test). The corrective action may include labeling the sensor data and other types of data associated with the EC window 130 as being associated with a defective EC window (e.g., for supervised training of a machine learning model). The corrective action may include causing electrical current to be applied to an EC window to maintain a tinting state, to cause use of a different control component (e.g., driver, gateway), to cause replacement of at least a portion of an EC window.

At transportation 250A of FIG. 2C, materials to be used in production of physical stage 239A are transported to facility 230A. The materials may be used to produce one or more of the ion conductor, cathode material, anode material, or the like that form the EC assembly 240. For example, a first material and a second material may be combined to generate the ion conductor. Transportation 250A may include one or more sensors 252A. The control module 220 may receive sensor data (e.g., vibration data, temperature data, etc.) from sensors 252A associated with transportation 250A of the materials. The control module 220 may store the sensor data and the material data with an identifier of each EC assembly 240 or EC window 130 that is to be produced based on the transported materials. The control module 220 may determine whether to cause a corrective action based on the sensor data from sensors 252A.

At facility 230A, the transported materials may arrive and the equipment 234A may perform manufacturing stage 238A of an EC window 130 to generate physical stage 239A (e.g., EC assembly 240 of EC window 130). The control module 220 may receive sensor data from sensors 236A (e.g., impedance data, acoustical data, temperature data, images of solder areas, images of etch areas, images of the EC assembly 240 at one or more tinting states, images of the EC assembly 240 changing tinting states, or the like) corresponding to the physical stage 239A. The control module 220 may receive sensor data corresponding to a point in time after production of physical stage 239A and prior to transportation 250B. The control module 220 may determine whether to cause a corrective action based on the sensor data from sensors 236A.

At transportation 250B, the physical stage 239A of the EC window 130 is transported from facility 230A to facility 230B. The control module 220 may receive sensor data (e.g., vibration data, temperature data, or the like) from sensors 252B during transportation 250B. The control module 220 may store the sensor data with an identifier of the corresponding EC windows 130. The control module 220 may determine whether to cause a corrective action based on the sensor data from sensors 252B.

Responsive to the transported physical stage 239A arriving at the facility 230B, the control module 220 may receive sensor data from sensors 236B associated with the physical stage 239A prior to production of physical stage 239B. The sensor data may be compared to the sensor data from sensors 236A prior to transportation 250B. Responsive to determining one or more differences between sensor data from sensors 236B and sensor data from sensors 236A (e.g., damage to the physical stage 239A during transportation 250B), control module 220 may cause a corrective action. Responsive to determining a corrective action is not to be performed (e.g., upon the physical stage 239A passing IQC optical and electrical tests at facilities 230A-B), the control module 220 may cause substrate 242 to be cleaned and prepared for lamination (e.g., by facility 230B). After physical stage 239A arriving at facility 230B and sensor data associated with physical stage 239A being received from sensors 236B, equipment 234B may generate physical stage 239B of EC window 130 (e.g., cause one or more substrates 242 to be laminated to the EC assembly 240 to generate a laminated unit). The control module 220 may receive sensor data from sensors 236B (e.g., impedance data, acoustical data, temperature data, image data, or the like) corresponding to the physical stage 239B. The control module 220 may receive the sensor data corresponding to a point in time after production of physical stage 239B and prior to transportation 250C. The control module 220 may determine whether to cause a corrective action based on the sensor data from sensors 236B.

At transportation 250C, the physical stage 239B of the EC window 130 is transported from facility 230B to facility 230C. The control module 220 may receive sensor data (e.g., vibration data, temperature data, humidity data, chemical substrate detection data, maximum impact sensor data, or the like) from sensors 252C from during transportation 250C. The control module 220 may store the sensor data with an identifier of the corresponding EC windows 130. The control module 220 may determine whether to cause a corrective action based on the sensor data from sensors 252C.

Responsive to transported physical stage 239B arriving at the facility 230C, the control module 220 may receive sensor data from sensors 236C associated with the physical stage 239B prior to production of physical stage 239C. The sensor data may be compared to the sensor data from sensors 236B prior to transportation 250C. Responsive to determining one or more differences between sensor data from sensors 236C and sensor data from sensors 236B (e.g., damage to the physical stage 239A during transportation 250B), control module 220 may cause a corrective action. After physical stage 239B arriving at facility 230C and sensor data associated with physical stage 239B being received from sensors 236C, equipment 234C may generate physical stage 239C of EC window 130 (e.g., IGU or LGU). The control module 220 may receive sensor data from sensors 236C (e.g., impedance data, acoustical data, temperature data, image data, or the like) corresponding to the physical stage 239C. The control module 220 may receive the sensor data corresponding to a point in time after production of physical stage 239C and prior to transportation 250D. The control module 220 may determine whether to cause a corrective action based on the sensor data from sensors 236C.

At transportation 250D, the physical stage 239C of the EC window 130 is transported from facility 230C to facility 230D. The control module 220 may receive sensor data (e.g., vibration data, temperature data, or the like) from sensors 252D from during transportation 250D. The control module 220 may store the sensor data with an identifier of the corresponding EC windows 130. The control module 220 may determine whether to cause a corrective action based on the sensor data from sensors 252D.

Responsive to transported physical stage 239C arriving at the facility 230D (e.g., installation site), the control module

220 may receive sensor data from sensors 236D associated with the physical stage 239C prior to production of physical stage 239D (e.g., prior to installation). The sensor data may be compared to the sensor data from sensors 236C prior to transportation 250D. In some embodiments, responsive to determining one or more differences between sensor data from sensors 236D and sensor data from sensors 236C (e.g., damage to the physical stage 239C during transportation 250D), control module 220 may cause a corrective action. After physical stage 239C arriving at facility 230D and sensor data associated with physical stage 239C being received from sensors 236D, equipment 234C may produce physical stage 239C of EC window 130 (e.g., installed IGU or LGU). The control module 220 may receive sensor data from sensors 236D (e.g., impedance data, acoustical data, temperature data, image data, or the like) corresponding to the physical stage 239D. In some embodiments, sensor data is received from sensors 252 of transportation 250 (e.g., transportation 250A-D) and from sensors 236 of facility 230 (e.g., facilities 230A-D) to track long term performance of EC windows 130. The sensor data may be tracked and stored to pinpoint where a defect or damage occurred (e.g., looking at the whole process throughout the lifetime of the panel). This chain of sensor data may be an unbroken chain of data that may be used to train one or more machine learning models so that the one or more trained machine learning models may be used to determine what (e.g., transportation 250, facility 230, process, material, installation, etc.) caused the EC window 130 to break or caused the lifespan or performance of the EC window 130 to decrease.

The sensor data collected from sensors 236D may include one or more of temperature data of individual components of the EC window system 100 (e.g., drivers, gateway, EC windows 130, etc.), voltage data associated with the EC windows 130 (e.g., voltage across an anode and cathode of EC window), electrical current data, driver data (e.g., charge applied by a driver), tint selection data, image data corresponding to EC windows 130, etc. The sensor data collected during this period may also include imaging data associated with tinting state (e.g., uniformity, speed of change, uniformity of change, etc.), user feedback, occupancy, etc. The sensor data can be aggregated and used by the control module 220 to determine whether any hardware failures have occurred during operation of the EC window 130 and/or are predicted to occur.

The control module 220 may receive the sensor data corresponding to multiple points in time after installation of physical stage 239D (e.g., in-field quality inspection, testing of already-installed EC windows 130). The quality testing after installation may include use of sensors 236D. The sensors 236D may include a portable scanner and/or one or more drones (e.g., combination of two drones flying at the same level and scanning the EC window 130). A portable scanner and/or one or more drones may have cameras that capture images at various locations on the EC window 130. In some embodiments, a first drone may carry a specific light or contrast pattern and the second drone may carry an imaging apparatus. Visual inspection may be conducted of already-installed EC windows 130 to spot check the EC windows 130 and track quality over time. Results (e.g., data received) from this testing may be used to alter manufacturing or installation techniques. The control module 220 may determine whether to cause a corrective action based on the sensor data from sensors 236D.

In some embodiments, each EC window 130 (e.g., one or more physical stages 239 of EC window 130) has at least one physical label (e.g., specifying an identifier, such as via a barcode, matrix barcode, or Quick Response (QR) code, of the EC window 130). The corresponding physical label of each EC window 130 may be scanned and the scanned information may be transmitted to the control module 220. The control module 220 and/or local control module 232 may cause a physical label to be generated and associated with each physical stage 239 of the EC window 130 (e.g., adhered to each physical stage 239, adhered to the packaging of each physical stage 239, etc.). In some embodiments, at the first facility 230A, the label may be associated with one or more of customer order number, panel identifier, Tvis, color space values (e.g., L*a*b*), grade, flex identifier, or the like.

At the second facility 230B, the label may be associated with one or more of customer order number, stock keeping unit (SKU) number, panel identifier, verified electrical data, verified Tvis, color space values (e.g., L*a*b*), pallet identifier, or the like. In some embodiments, the SKU identifies one or more of a type of electrochromic window, a construction type of electrochromic window, a configuration of the electrochromic window, glass unit configuration of the electrochromic window, window size and orientation (e.g., window base, window height, orientation), cable information (e.g., cable type, location, length). For example, the SKU could be several characters in length, where a character specifies the electrochromic window type, another character specifies the construction type, another character specifies a glass unit configuration, another character specifies window base, another character specifies window height, another character specifies window orientation, another character specifies cable type, another character specifies cable location, and another character specifies cable length. For the control module 220 to perform a spectral test, the spectral test may use sensor data and performance data for each physical stage (e.g., for EC assembly 240, for a laminated unit). This data may be used in conjunction with the SKU.

A device SKU table may include one or more of a product identifier, a SKU number, a type (e.g., window, driver, cabinet, etc.), a location (e.g., region), or the like. A window SKU table may include an identifier, a SKU number, a first offset number (e.g., offset "a"), a second offset number (e.g., offset "b"), a third offset number (e.g., offset "L"), a solar heat gain coefficient (SHGC), a U-value, a coulombs per square meter, Tvis per $Q/(cm^2)$, a first tolerance (e.g., tolerance "L"), a second tolerance (e.g., tolerance "A"), and/or a third tolerance (e.g., tolerance "B"). A SKU table (e.g., device SKU table, window SKU table) may act like a spec-sheet for that configuration (e.g., device configuration, EC window 130 configuration). The SKU table may convey the test parameters (e.g., threshold sensor data values) to the control module 220 of what is acceptable (e.g., the measured sensor data values are to meet the threshold sensor data values) and may display expected device performance (e.g., to the customer purchasing the device or EC window). The control module 220 and/or local control module 232 may compare sensor data received from sensors 252 and/or 236 to the test parameters in the SKU table to determine whether a corrective action is to be performed.

In some embodiments, an EC window 130 may be tracked throughout the manufacturing, transportation, and installation processes and after installation. An EC window 130 may be associated with an identifier that identifies the specific EC window 130 (e.g., for individual part analysis). An EC window 130 may be associated with an identifier that identifies a group (e.g., batch) of EC windows 130 (e.g., for cohort system analysis). In some embodiments, a SKU number may describe a batch or type of product (e.g., type of EC windows 130, EC windows 130 made from the same batch of materials and/or during the same period of time). Cohort statistical analysis (e.g., for a batch or type of EC windows 130) and data collection for cohort statistical analysis may be different from individual part analysis. The machine learning and statistical methods for each system (e.g., cohort system analysis, individual part analysis, etc.) may be different. An advantage of collecting data at each point of the processes (e.g., transportation 250, facilities 230, etc.) from creation to installation and tracking changes of each part (e.g., EC window 130) may be that this allows performance of better analyses on each individual and assembled part. Connecting data points (e.g., individual part identifier, SKU, batch identifier, pigtail identifier, etc.) together into uniquely identified items (e.g., arch item identifier in the final system) may make the system different from a normal inventory or SKU based system. Each product (e.g., EC window 130) may be tested individually and as part of a whole batch or SKU.

A file (e.g., CSV file, SKU file) may store each new SKU. The SKU file may be uploaded to the control module 220 to be parsed and placed (e.g., pushed) by the control module 220 in a database. The SKUs and configurations may be exposed via the API (e.g., to be pulled by control module 220).

At the third facility 230C, the label may be associated with one or more of customer order number, SKU number, panel identifier, cable identifier (e.g., pigtail number), location identifier (e.g., location to be installed, building identifier, identifier of location in building, or the like), verified electrical data, verified Tvis, color space values (e.g., L*a*b*), pallet identifier, printed window label, or the like.

At the fourth facility 230D, the label may be associated with one or more of customer order number, SKU number, panel identifier, verified electrical data, verified Tvis, color space values (e.g., L*a*b*), pallet identifier, re-assigned window label, or the like.

In some embodiments, the cloud computing system 110 may communicate with each of the facilities 230 and with an API. The cloud computing system 110 and facilities 230 may communicate with one or more data stores via the API. The one or more data stores may store SKU specific data, system design data (e.g., order details, 3D model, etc.), or the like. In some embodiments, information may be manually entered (e.g., SKU identifiers, order details) or may be automatically retrieved.

In some embodiments, prior to transporting a physical stage 239 of the EC window 130 from a facility 230, the EC window 130 is tinted and first sensor data corresponding to the tint level is received. Upon arrival of the physical stage 239 at the next facility 230, second sensor data corresponding to the tint level is received. The first and second sensor data are compared to determine whether the EC window 130 changed tint level (e.g., leaked) during transportation 250. Upon determining difference between the first and second sensor data exceeds a threshold amount, the control module 220 may cause a corrective action.

In some embodiments, control module 220 may receive first sensor data (e.g., associated with directing a current tinting state of an EC window 130 to correspond to a first tint) level prior to transportation 250 and may receive second sensor data (e.g., associated with directing a current tinting state of the EC window 130 to correspond to the first tint level) after transportation 250. The control module 220 may determine whether the difference between the first sensor data and the second sensor data exceeds a threshold amount (e.g., to determine whether the EC window 130 was damaged during transportation 250). Upon determining difference between the first and second sensor data exceeds a threshold amount, the control module 220 may cause a corrective action. In some embodiments, prior to directing the current tinting state to correspond to a first tinting state, the current tinting state may be caused to correspond to a second tinting state different from the first tinting state. In some embodiments, transfer learning may be used. In transfer learning, an algorithm trained on a similar problem may be re-trained with new data to detect a new problem (e.g., lessening training time). Transfer learning may help quickly train machine learning models to detect the differences and detect differences in thresholds without manually adjusting due to variation throughout time.

The control module 220 may determine, based on corresponding sensor data, prior to each transportation of physical stage 239 of the EC window 130 and/or upon receiving the physical stage 239 (e.g., prior to performing any manufacturing or installation) whether a corrective action is to be performed. Upon determining a corrective action is to be performed, the physical stage 239 of the EC window 130 may not be transported to the next physical stage 239 and/or may not have any further manufacturing or installation processes performed until the corrective action has been performed. The corrective action may include discarding the current physical stage 239 of the EC window 130 and causing a replacement to be produced.

Figures 3, 4:
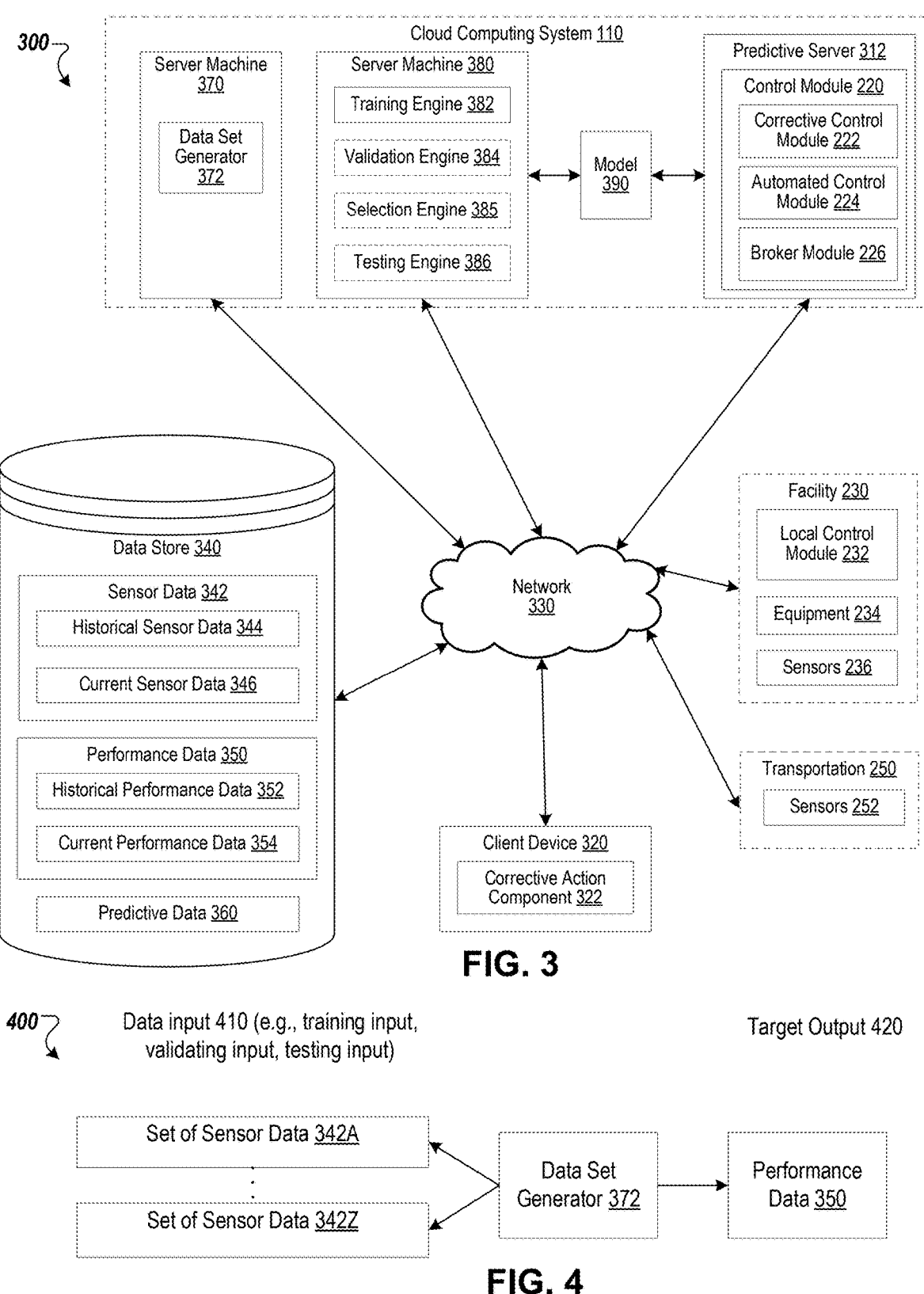
FIG. 3 is a block diagram illustrating an exemplary system for control of electrochromic windows, according to certain embodiments.
FIG. 4 is an example data set generator to create data sets for a machine learning model using sensor data and performance data, according to certain embodiments.

The sensor data from sensors 252A-D of transportation 250A-D and sensors 236A-B of facilities 230A-D may be collected and stored at data store 340 (e.g., see FIG. 3). The sensor data may include all data collected during the manufacturing and transportation of each EC window 130. After installation of the EC window at facility 230D, the sensor data that was collected during manufacture and transportation may be used to predict and correct hardware failures of the installed EC windows 130. For example, certain sensor data collected for an EC window 130 may indicate that the EC window 130 is more likely to have a particular hardware failure which may help in diagnosis and correction of hardware failures that occur after installation.

In some embodiments, once the hardware failure is identified (e.g., predicted and/or detected), the corrective control module 222 may initiate a corrective action. The corrective action may be selected based on the identified hardware failure. In one example, the hardware failure may be an overheating driver. The corrective action for an overheating or malfunctioning driver may be to select a different properly functioning driver to control the EC window 130. The hardware failure may be any malfunctioning component (e.g., driver, gateway, repeater, wall or keypad controllers, etc.) that is determined to be operating differently than other components. In some embodiments, the hardware components may be replaced (e.g., upon a periodic maintenance visit). Additionally, software stack performance may be monitored and any bugs may be fixed using an occasional software update. Glass breakage may be an additional hardware failure signature that may be detected by the corrective control module (e.g., based on driver data or other performance data. In some embodiments, the system may provide for self-correction such as with a leaky panel, battery levels, sense failover (e.g., if sense fails on one EC window, use its neighbors data as a proxy), or failure detection. In some embodiments, the corrective control module 222 may provide an alert (e.g., a notification, indication, etc.) that a hardware failure has occurred that needs to be manually addressed. In some embodiments, the system may provide self-learning or self-adjusting corrective action that adapts with the data and state of the EC window. For example, if a leak gets worse the system adjusts the compensating inputs (e.g., via re-training of a trained machine learning model based on updated sensor data). In some embodiments, the system uses transfer learning. For example, a machine learning model is trained on a related dataset and is enhanced (e.g., re-trained) by feeding sensor data from the current system. The trained machine learning model is more accurate with a small data set (e.g., from the current system) sooner (e.g., by also being trained by related data from a different system). The trained machine learning model may be used to detect flaws in image data and/or anomalies in time-series data.

FIG. 3 is a block diagram illustrating an exemplary system 300 (exemplary system architecture) for control of EC windows 130 (e.g., electrochromic devices), according to certain embodiments. The system 300 includes a client device 320, one or more facilities 230, one or more transportation 250, a predictive server 312 (e.g., to generate predictive data, to determine whether a corrective action is to be performed, etc.), and a data store 340. The predictive server 312 may be part of a cloud computing system 110. The cloud computing system 110 may further include server machines 370 and 380.

The cloud computing system 110 may further include one or more facilities 230 and/or one or more transportation 250, such as the facilities 230A-D and transportation 250A-D of FIG. 2C. Each facility 230 may include a local control module 232, equipment 234, and one or more sensors 236. Each transportation 250 may include sensors 252.

The client device 320, facility 230, predictive server 312, data store 340, server machine 370, and server machine 380 may be coupled to each other via a network 330 for generating predictive data 360 to perform corrective actions.

In some embodiments, network 330 is a public network that provides client device 320 with access to the predictive server 312, data store 340, and other publically available computing devices. In some embodiments, network 330 is a private network that provides client device 320 access to facility 230, data store 340, and other privately available computing devices. Network 330 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The client device 320 may include a computing device such as personal computers (PCs), laptops, mobile phones, smart phones, tablet computers, netbook computers, network connected televisions ("smart TV"), network-connected media players (e.g., Blu-ray player), a set-top-box, over-the-top (OTT) streaming devices, operator boxes, etc. The client device 320 may include a corrective action component 322 (e.g., dashboard web app 140, dashboard mobile app 142, etc.). The client device 320 may (e.g., via corrective action component 322) receive a selection of an EC window 130 (e.g., via user input received through a GUI) and transmit the selection to the cloud computing system 110. The cloud computing system 110 may receive sensor data 342 associated the EC window 130 (e.g., associated with directing a current tinting state of the EC window 130 to correspond to a tinting state, receive from data store 340, etc.), and generate output (e.g., predictive data 360). The client device 320 may (e.g., via corrective action component 322) receive the output (e.g., indicative of a corrective action to be performed based on the sensor data)

from the cloud computing system 110 and cause a corrective action (e.g., based on the output) associated with the EC window 130. Each client device 320 may include an operating system that allows users to one or more of generate, view, or edit data (e.g., selection of EC windows 130, performance data 350 of EC windows 130, corrective actions for EC windows 130, or the like).

Data store 340 may be a memory (e.g., random access memory), a drive (e.g., a hard drive, a flash drive), a database system, or another type of component or device capable of storing data. Data store 340 may include multiple storage components (e.g., multiple drives or multiple databases) that may span multiple computing devices (e.g., multiple server computers). The data store 340 may store sensor data 342 (e.g., historical sensor data 344, current sensor data 346), performance data 350 (e.g., historical performance data 352, current performance data 354), and predictive data 360. The historical sensor data 344 and historical performance data 352 may be historical data (e.g., at least a portion for training the machine learning model 390). The current sensor data 346 may be current data (e.g., at least a portion to be input into the trained machine learning model 390, subsequent to the historical data) for which predictive data 360 is to be generated (e.g., for performing corrective actions). The current performance data 354 may also be current data (e.g., for re-training the trained machine learning model).

The sensors 236 and 252 may provide sensor data 342 associated with producing, transporting, installing, testing, using, or the like of EC windows 130 (e.g., materials to produce EC windows, physical stages of EC windows 130, etc.). Sensor data 342 may include data associated with directing the current tinting state of an EC window 130 to correspond to a first tinting state. Sensor data 342 may include data associated with the equipment 234 (e.g., producing and/or installing the EC window). Sensor data 342 may include data received from one or more data sources. The sensor data 342 may be used to determine whether a corrective action is to be performed. The sensor data 342 may include sensor values received over a period of time (e.g., corresponding to during and/or after the directing of the current tinting state to correspond to a first tinting state).

Sensor data 342 may be associated with properties of an EC window 130. In some embodiments, the sensor data 342 may be associated with voltage data, electrical current data, temperature data, or image data corresponding to the EC window 130 (e.g., measured over time subsequent to directing the current tinting state to correspond to a first tint level). In some embodiments, the sensor data 342 may be associated with the amount of light that goes through the EC window 130 during or subsequent to directing the current tinting state to correspond to a first tint level (e.g., causing a first amount of electric charge to enter the EC window 130). In some embodiments, the sensor data may include one or more images of the EC window 130 (e.g., captured during or subsequent to directing the current tinting state to correspond to a first tint level). The sensor data 342 may include color space values (e.g., L*a*b* color space values) based on the light that is received through the EC window 130 and/or images of the EC window 130. The sensor data 342 may include one or more of a light measurement, a Tvis value, a wavelength, color space values, electrical measurements, image data, vibration data, temperature data, humidity data, impedance data, acoustic data, or the like. Sensor data 342 may be associated with or indicative of manufacturing parameters such as hardware parameters (e.g., settings or components (e.g., size, type, etc.) of the equipment 234) or process parameters of the equipment 234.

The performance data 350 may include property data of the EC window 130. In some embodiments, the performance data 350 may be associated with a difference between the desired tinting state and the current tinting state. In some embodiments, the performance data 350 may be an indication of a group (e.g., cluster) of similar EC windows 130. In some embodiments, the performance data 350 may be an indication of a classification of the EC window 130 (e.g., grade, defective, non-defective, lifespan, etc.). In some embodiments, the performance data 350 is associated with metrology data (e.g., measurement of tinting level, amount of light that passes through the EC window 130, color of the EC window 130 at a tinting level, or the like). In some embodiments, the performance data 350 may be associated with uniformity of tinting state, uniformity of changing of tinting state, speed of changing of tinting state, change in tinting state over time (e.g., not maintaining a tinting state), failing to change tinting state, change of a measured voltage across an anode and cathode of the EC window 130 (e.g., drop in measure voltage), etc.

The performance data 350 may include an indication of whether the EC window 130 is normal (e.g., not defective) or abnormal (e.g., defective). The performance data 350 may include information associated with a difference between a desired tinting state and an actual tinting state of an EC window 130 (e.g., whether the difference is greater than a threshold difference). The performance data 350 may indicate a lifetime of an EC window 130 (or of a component of an EC window 130). For example, responsive to an EC window 130 malfunctioning, performance data 350 including the malfunction and the age of the EC window 130 at the time of malfunctioning may be generated (e.g., via user input, via the client device 320, via the control module e220, etc.). The performance data 350 may indicate a grade of the EC window 130 (e.g., "A" grade, "B" grade, a threshold quality level the EC window 130 meets). The performance data 350 may include information indicative of a grouping of other electrochromic devices (e.g., EC windows 130) to which the EC window 130 corresponds. The performance data 350 may include information indicative of a classification of the EC window 130. The performance data 350 may be provided responsive to inspection of the EC window 130. In some embodiments, the performance data 350 is provided by metrology equipment. The performance data 350 may be of a finished or semi-finished EC window 130 (e.g., physical stage 239 of an EC window 130). The performance data 350 may be used for supervised machine learning.

In some embodiments, client device 320 provides performance data 350 associated with the EC windows 130. The performance data 350 may include a predictive percentage which indicates an amount of installed EC windows 130 that were normal or abnormal (e.g., 98% normal products) or are predicted to be produced normal or abnormal. For example, if 98% of a historical set of installed EC windows 130 were normal and 2% were abnormal, the client device 320 may provide performance data 350 indicating that 98% of a new set of installed EC windows 130 are predicted to be normal.

In some embodiments, the cloud computing system 110 may generate predictive data 360 using supervised machine learning (e.g., using a labeled data set, using performance data 350 indicative of performance of specific historical EC windows 130, etc.). In some embodiments, the cloud computing system 110 may generate predictive data 360 using semi-supervised learning (e.g., semi-supervised data set, performance data 350 is a predictive percentage, etc.). In some embodiments, the cloud computing system 110 may generate predictive data 360 using unsupervised machine learning (e.g., unlabeled data set, etc.). Labeled data sets may be used to train supervised machine learning models and unlabeled data sets may be used to train unsupervised learning models. Semi-supervised learning models may be a combination of supervised and unsupervised training models.

In some embodiments, the predictive data 360 may be indicative of a classification of the EC window 130 (e.g., actual tinting state is a threshold difference from the desired tinting state, or the like). In some embodiments, the predictive data 360 may be indicative of whether the EC window 130 is abnormal or normal. In some embodiments, the predictive data 360 may be indicative of a grouping of the EC window 130 (e.g., with other EC windows 130 with similar sensor data). The predictive data 360 may be indicative of one or more of predicted performance data of an EC window 130, predicted lifetime of the EC window, predicted defect of the EC window 130, predicted classification of the EC window 130, predicted ranking of one or more causes of the classification of the EC window 130, or the like. The client device 320 (e.g., corrective action component 322) may cause a corrective action to be performed based on the predictive data 360.

In some embodiments, historical performance data 352 corresponds to historical property data of historical EC windows 130 (e.g., corresponding to historical sensor data 344) and the predictive data 360 is associated with predictive property data of current EC windows 130 (e.g., corresponding to current sensor data 346). In some embodiments, the predictive data 360 is predicted metrology data (e.g., virtual metrology data) of the EC windows 130 that are being produced or that have been produced. In some embodiments, the predictive data 360 is an indication of abnormal EC windows 130 and/or one or more causes of the abnormal EC windows 130.

Performing metrology (e.g., performing additional tests of an EC window 130, such as disassembly of an EC window 130 to test components or using additional metrology equipment to generate additional sensor data) can be costly in terms of time required, additional metrology equipment used, energy consumed, bandwidth used to send the metrology data, processor overhead to process the metrology data, etc. By inputting sensor data 342 and receiving output of predictive data 360, system 300 can have the technical advantage of avoiding the costly process of using additional metrology equipment to generate additional metrology data for EC windows 130.

Removing an EC window 130 and manufacturing, transporting, and installing a new EC window 130 can be costly in terms of time required, energy, products, materials, equipment 234 used to make the products, cost of discarding the EC window 130, etc. By inputting sensor data 342 and receiving output of predictive data 360, system 300 can have the technical advantage of performing corrective actions (e.g., causing electrical current to be applied to restore an electric charge to maintain a first tinting state, using a different control component, causing replacement of one or more components associated with the EC window) and avoiding the costly process of replacing an entire EC window 130.

Manufacturing, installation, and/or usage tolerances (e.g., manufacturing, installation, and/or usage specifications, parameters, or requirements) may be overly stringent for EC windows 130 which may have costly results of increased resource (e.g., energy, coolant, gases, materials, etc.) consumption, increased amount of time to produce the products, increased component failure, increased discarded products, etc. By training a machine learning model 390 based on the sensor data 342 (e.g., and performance data 350), system 300 can have the technical advantages of determining updated manufacturing, installation, and/or usage tolerances associated with non-defective EC windows 130. For example, the system 300 may use the trained machine learning model to rank causes of defective EC windows 130 and loosening manufacturing, installation, and/or usage tolerances that are not related to the ranked (e.g., high-ranked) causes of defective EC windows 130. System may loosen tolerances of certain processes responsive to determining a variance in the production, installation, and/or usage of EC windows 130 but no issue in product performance.

In some embodiments, the machine learning model 390 may be trained based on data input of historical sensor data 344 of EC windows 130 (e.g., unsupervised learning). The trained machine learning model 390 may receive input of current sensor data 346 of an EC window 130 and may provide predictive data 360 (e.g., that groups or clusters the EC window 130 with similar EC windows 130). The predictive data 360 may indicate whether an EC window 130 is abnormal.

In some embodiments, the machine learning model 390 may be trained based on data input of historical sensor data 344 and target output of historical performance data 352 (e.g., supervised learning). The trained machine learning model 390 may receive input of current sensor data 346 of an EC window 130 and may provide predictive data 360 (e.g., that classifies the EC window 130). Based on the predictive data 360, the client device 320 (e.g., via corrective action component 322) may cause a corrective action to be performed. In some embodiments, the predictive data 360 indicates a ranking of causes of the defective and/or abnormal EC window 130.

In some embodiments, cloud computing system 110 may input current sensor data 346 into one or more machine learning models 390 (e.g., ensemble machine learning model). The cloud computing system 110 may input the current sensor data 346 into an unsupervised machine learning model to determine whether the EC window 130 is abnormal (e.g., compared to historical EC windows 130) and the cloud computing system 110 may input the current sensor data 346 into a supervised machine learning model to determine a classification of the EC window 130 (e.g., defective, non-defective, ranking of causes, etc.).

A corrective action may include providing an alert or indication that an electrochromic device has a hardware defect. In other examples, the corrective action may include applying an electric current across the device to stabilize the voltage and therefore the tinting level of the device. In addition, the corrective action may include using certain control components (e.g., gateway, driver, etc.) of the system to control EC windows 130 while preventing use of other control components (e.g., other gateway, other driver, etc.) of the system to control EC windows 130. A corrective action may include replacement of one or more components associated with the EC window 130.

The predictive server 312, server machine 370, and server machine 380 may each include one or more computing devices such as a rackmount server, a router computer, a server computer, a personal computer, a mainframe computer, a laptop computer, a tablet computer, a desktop computer, graphics processing unit (GPU), accelerator application-specific integrated circuit (ASIC) (e.g., tensor processing unit (TPU)), etc.

The predictive server 312 may include a control module 220. The control module 220 may include a corrective control module 222, automated control module 224, and a broker module 226. In some embodiments, the control module 220 may retrieve current sensor data 346 from the data store 340 and generate output (e.g., predictive data 360) for performing a corrective action based on the current sensor data 346. In some embodiments, the control module 220 may use a trained machine learning model 390 to determine the output for determining whether to cause a corrective action to be performed based on the current sensor data 346. The trained machine learning model 390 may be trained using the historical sensor data 344 and/or historical performance data 352 to learn patterns (e.g., relating sensor data 342 to performance data 350).

In some embodiments, the client device 320 may store current sensor data 346 (e.g., sensor data received after the receiving of the historical sensor data 344, sensor data received after training of the model 390, sensor data for which there is no metrology data) in the data store 340 and the control module 220 may retrieve the current sensor data 346 from the data store 340. In some embodiments, the predictive server 312 may store output (e.g., predictive data 360) of the trained machine learning model 390 in the data store 340 and the client device 320 may retrieve the output from the data store 340.

In some embodiments, cloud computing system 110 further includes server machine 370 and server machine 380. Server machine 370 includes a data set generator 372 that is capable of generating data sets (e.g., a set of data inputs and a set of target outputs) to train, validate, and/or test a machine learning model 390. Some operations of data set generator 372 are described in detail below with respect to FIGS. 4 and 6A. In some embodiments, the data set generator 372 may partition the historical data (e.g., historical sensor data 344 and historical performance data 352) into a training set (e.g., sixty percent of the historical sensor data 344 and historical performance data 352), a validating set (e.g., twenty percent of the historical sensor data 344 and historical performance data 352), and a testing set (e.g., twenty percent of the historical sensor data 344 and historical performance data 352). In some embodiments, the machine learning model 390 may be validated using one or more types of validation, such as Cross Validation, Leave One Out Cross-Validation (LOOCV), K-Folds Cross Validation (e.g., a 5-fold train/test split), or the like. In some embodiments, the cloud computing system 110 (e.g., via control module 220) generates multiple sets of features. For example a first set of features may correspond to a first set of types of sensor data (e.g., from a first set of sensors, first combination of values from first set of sensors, first patterns in the values from the first set of sensors) that correspond to each of the data sets (e.g., training set, validation set, and testing set) and a second set of features may correspond to a second set of types of sensor data (e.g., from a second set of sensors different from the first set of sensors, second combination of values different from the first combination, second patterns different from the first patterns) that correspond to each of the data sets.

Prior to the partitioning of the historical data (e.g., historical sensor data 344 and historical performance data 352), feature engineering may be performed to create features (e.g., variables) from the raw data using one or more types of aggregation, such as one or more of difference, minimum, maximum, median, mode, mean, first derivative, second derivative, skewness, kurtosis, starting at certain triggers or events, or the like. Raw data (e.g., historical data, current data) may be received. Feature engineering and feature selection may be performed on the raw data to generate processed data (e.g., features, variables). Generating the processed data may further include one or more of normalizing the data (e.g., to increase model detection accuracy), using aggregated (e.g., median) values, or the like. The processed data may be partitioned to generate partitioned data sets (e.g., training set, testing set, etc.). Model evaluation may be performed using the partitioned data sets (e.g., training set, testing set, validation set) to perform model tuning. Hyperparameter tuning may be performed (e.g., via grid search, via parameter sweep, via searching through manually specified subset of hyperparameter space of learning algorithm) to fine tune the model (e.g., on actual data). A model may be selected (e.g., select the best performing model or use an ensemble method). Accuracy may be one of many outputs (e.g., scores) used to measure performance of a model. Each model and what is done with the model may change which measurement is used (e.g., sometimes an F1 score, sometimes a confusion matrix, sometimes a means squared error). Which measurement is used may depend on the model and the use. The scores are compared and evaluated to select the model that meets the needs. After the model is selected, the model may be deployed.

Server machine 380 may include a training engine 382, a validation engine 384, selection engine 385, and/or a testing engine 386. An engine (e.g., training engine 382, a validation engine 384, selection engine 385, and a testing engine 386) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 382 may be capable of training a machine learning model 390 using one or more sets of features associated with the training set from data set generator 372. The training engine 382 may generate multiple trained machine learning models 390, where each trained machine learning model 390 corresponds to a distinct set of features of the training set (e.g., sensor data from a distinct set of sensors). For example, a first trained machine learning model may have been trained using all features (e.g., X1-X5), a second trained machine learning model may have been trained using a first subset of the features (e.g., X1, X2, X4), and a third trained machine learning model may have been trained using a second subset of the features (e.g., X1, X3, X4, and X5) that may partially overlap the first subset of features.

The validation engine 384 may be capable of validating a trained machine learning model 390 using a corresponding set of features of the validation set from data set generator 372. For example, a first trained machine learning model 390 that was trained using a first set of features of the training set may be validated using the first set of features of the validation set. The validation engine 384 may determine an accuracy of each of the trained machine learning models 390 based on the corresponding sets of features of the validation set. The validation engine 384 may discard trained machine learning models 390 that have an accuracy that does not meet a threshold accuracy. In some embodiments, the selection engine 385 may be capable of selecting one or more trained machine learning models 390 that have an accuracy that meets a threshold accuracy. In some embodiments, the selection engine 385 may be capable of selecting the trained machine learning model 390 that has the highest accuracy of the trained machine learning models 390.

The testing engine 386 may be capable of testing a trained machine learning model 390 using a corresponding set of features of a testing set from data set generator 372. For example, a first trained machine learning model 390 that was trained using a first set of features of the training set may be tested using the first set of features of the testing set. The testing engine 386 may determine a trained machine learning model 390 that has the highest accuracy of all of the trained machine learning models based on the testing sets.

In some embodiments, the data may be partitioned into two or three parts (e.g., training data set, testing data set, and/or validation data set). The model may be trained using the training data set. How well the model learned may be determined by comparing the model against the test data set. This may be performed multiple times, tuning the model and balancing over-fitting and under-fitting to the data. The trained model may be tested against a validation data set to test the model on data that the model has not been exposed (e.g., on which the model has not been trained). Inputting non-labeled data (e.g., unsupervised training) into the model may be a final validation of the model simulating real-world model performance. For model selection, several models may be used (e.g., each model may have different sets of strengths and/or weaknesses) to find a counterbalancing model. Each of the models may be tested with different methods (e.g., training, validating, testing, etc.) and the top-performing model may be selected or multiple models (e.g., the top-performing models) may be used by averaging scores (e.g., weighted averaging).

The machine learning model 390 may refer to the model artifact that is created by the training engine 382 using a training set that includes data inputs and corresponding target outputs (correct answers for respective training inputs). Patterns in the data sets can be found that map the data input to the target output (the correct answer), and the machine learning model 390 is provided mappings that captures these patterns. The machine learning model 390 may use one or more of the following methods: supervised, unsupervised, or semi-supervised machine learning methods. This may include, but is not limited to, the following: Support Vector Machine (SVM), Radial Basis Function (RBF), clustering algorithms, k-nearest neighbor algorithm (k-NN), linear regression, linear regression, multi-variable regression, random forest, random cut forest, random forest regression, neural networks (e.g., artificial neural network), convolutional neural network (CNN), recursive CNN, deep neural nets, ensemble machine learning (e.g., combination of models), etc. The machine learning model 390 may be used for AI-assisted root cause analysis. With the collection of data at multiple points, the machine learning model 390 may be used one or more of: to assist in root cause analysis; to guide predictive maintenance with virtual robot solutions on underperforming EC windows 130; or to assist in corrective control to reduce costs, increase yield, and tune the manufacturing process.

Control module 220 may provide current sensor data 346 to the trained machine learning model 390 and may run the trained machine learning model 390 on the input to obtain one or more outputs. The control module 220 may be capable of determining (e.g., extracting) predictive data 360 from the output of the trained machine learning model 390 and may determine (e.g., extract) confidence data from the output that indicates a level of confidence that the predictive data 360 corresponds to performance data of EC windows 130 produced or to be produced (e.g., that correspond to the current sensor data 346). The control module 220 or corrective action component 322 may use the confidence data to decide whether to cause a corrective action associated with the equipment 234 based on the predictive data 360.

The confidence data may include or indicate a level of confidence that the predictive data 360 corresponds to the EC windows 130 associated with the current sensor data 346. In one example, the level of confidence is a real number between 0 and 1 inclusive, where 0 indicates no confidence that the predictive data 360 corresponds the EC windows 130 associated with the current sensor data 346 and 1 indicates absolute confidence that the predictive data 360 corresponds to EC windows 130 associated with at least a portion of the current sensor data 346. In some embodiments, the system 300 may use cloud computing system 110 to determine predictive data 360 instead of using additional metrology equipment (e.g., additional testing) to determine current performance data 354. In some embodiments, responsive to the confidence data indicating a level of confidence that is below a threshold level, the system 300 may cause additional metrology equipment to generate the current performance data 354. Responsive to the confidence data indicating a level of confidence below a threshold level for a predetermined number of instances (e.g., percentage of instances, frequency of instances, total number of instances, etc.) the control module 220 may cause the trained machine learning model 390 to be re-trained (e.g., based on the current sensor data 346 and current performance data 354, etc.). In some embodiments, the control module 220 may cause a corrective action responsive to the confidence data meeting a first threshold (e.g., 80% confident, 3 standard deviations away), the control module 220 may provide an alert (e.g., warning, cause further tests to be ran) responsive to the confidence data meeting a second threshold (e.g., 60% confident), and the control module 220 may not cause a corrective action or further testing responsive to the confidence data meeting a third threshold (e.g., 30% confident).

For purpose of illustration, rather than limitation, aspects of the disclosure describe the training of a machine learning model using historical sensor data 344 (and historical performance data 352) and inputting current sensor data 346 into the trained machine learning model to determine predictive data 360. In other implementations, a heuristic model or rule-based model (e.g., comparing sensor data to threshold values) is used to determine predictive data 360 (e.g., without using a trained machine learning model). Control module 220 may monitor historical sensor data 344 (and historical performance data 352). Any of the information described with respect to data inputs 410 of FIG. 4 may be monitored or otherwise used in the heuristic or rule-based model.

In some embodiments, the functions of client device 320, predictive server 312, server machine 370, and server machine 380 may be provided by a fewer number of machines. For example, in some embodiments server machines 370 and 380 may be integrated into a single machine, while in some other embodiments, server machine 370, server machine 380, and predictive server 312 may be integrated into a single machine. In some embodiments, client device 320 and predictive server 312 may be integrated into a single machine.

In general, functions described in one embodiment as being performed by client device 320, predictive server 312, server machine 370, and server machine 380 can also be performed on predictive server 312 in other embodiments, if appropriate. In addition, the functionality attributed to a particular component can be performed by different or multiple components operating together. For example, in some embodiments, the predictive server 312 may determine the corrective action based on the predictive data 360. In another example, client device 320 may determine the predictive data 360 based on output from the trained machine learning model 390.

In addition, the functions of a particular component can be performed by different or multiple components operating together. One or more of the predictive server 312, server machine 370, or server machine 380 may be accessed as a service provided to other systems or devices through appropriate APIs. In some embodiments, a trained machine learning model is deployed via an API. In some embodiments, a trained machine learning model is deployed via a client device (e.g., end device, gateway, driver, etc.).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Although embodiments of the disclosure are discussed in terms of generating predictive data 360 to perform a corrective action for an installed EC window 130, embodiments may also be generally applied to determining actions to be taken. Embodiments may be generally applied to actions to be taken based on different types of data. For example, features of sensor data and corresponding component failure data may be used for predicting end of life of components.

FIG. 4 is an example data set generator 372 to create data sets for a machine learning model 390 using sensor data 342 and performance data 350, according to certain embodiments. System 400 of FIG. 4 shows data set generator 372, data inputs 410, and target output 420.

In some embodiments, data set generator 372 generates a data set (e.g., training set, validating set, testing set) that includes one or more data inputs 410 (e.g., training input, validating input, testing input) and one or more target outputs 420 that correspond to the data inputs 410. The data set may also include mapping data that maps the data inputs 410 to the target outputs 420. Data inputs 410 may also be referred to as "features," "attributes," or information." In some embodiments, data set generator 372 may provide the data set to the training engine 382, validating engine 384, or testing engine 386, where the data set is used to train, validate, or test the machine learning model 390. Some embodiments of generating a training set may further be described with respect to FIG. 6A.

In some embodiments, data set generator 372 generates the data input 410 and target output 420. In some embodiments, data inputs 410 may include one or more sets of sensor data 342 (e.g., historical sensor data 344 of FIG. 3 and/or one or more of facility data 260, SKU specific data 262, system design data 264, order data 266, scale data 268, data from installer module 270, or test data 272 of FIG. 2D). The data inputs 410 may include individual unit specific data (e.g., data specific to a particular EC window 130). Sensor data 342 may include one or more of sensor data from one or more types of sensors, combination of sensor data from one or more types of sensors, patterns from sensor data from one or more types of sensors, etc. Target output may include performance data 350 (e.g., historical performance data 352).

In some embodiments, data set generator 372 may generate a first data input corresponding to a first set of sensor data 342A (e.g., first features of historical sensor data 344)

to train, validate, or test a first machine learning model and the data set generator 372 may generate a second data input corresponding to a second set of sensor data 342B (e.g., second features of historical sensor data 344) to train, validate, or test a second machine learning model.

In some embodiments, the data set generator 372 may discretize (e.g., segment) one or more of the data input 410 or the target output 420 (e.g., to use in classification algorithms for regression problems). Discretization (e.g., segmentation via a sliding window) of the data input 410 or target output 420 may transform continuous values of variables into discrete values. In some embodiments, the discrete values for the data input 410 indicate discrete sensor values (e.g., color space values, Tvis, electrical values, acoustic values, temperature values, impedance values, or the like) to obtain a target output 420 (e.g., discrete performance data).

Data inputs 410 and target outputs 420 to train, validate, or test a machine learning model may include information for a particular facility (e.g., for a particular manufacturing facility, for a particular installation, or the like). For example, the sensor data 342 and performance data 350 may be for EC windows 130 from the same manufacturing facility.

In some embodiments, the information used to train the machine learning model may be for specific types of EC windows 130 having specific characteristics (e.g., same stage of manufacturing, same type of EC window 130, or the like) and allow the trained machine learning model to determine outcomes for a specific group of EC windows 130 based on input for current sensor data 346 associated with one or more components sharing characteristics of the specific group. In some embodiments, the information used to train the machine learning model may be for two or more types of EC windows 130 and may allow the trained machine learning model to determine outcomes for a specific type of EC window 130 based on input associated with the specific type of EC window 130. In some embodiments, the information used to train the machine learning model may be associated with EC window 130 that have been identified as defective in one or more ways. In some embodiments, the information used to train the machine learning model may be associated with an EC window 130 that was caused to simulate a defective EC window (e.g., remove charge from the EC window 130 to simulate a leaky window).

In some embodiments, subsequent to generating a data set and training, validating, or testing machine learning model 390 using the data set, the machine learning model 390 may be further trained, validated, or tested (e.g., current sensor data 346 and current performance data 354 of FIG. 3) or adjusted (e.g., adjusting weights associated with input data of the machine learning model 390, such as connection weights in a neural network).

Figures 5, 6A:
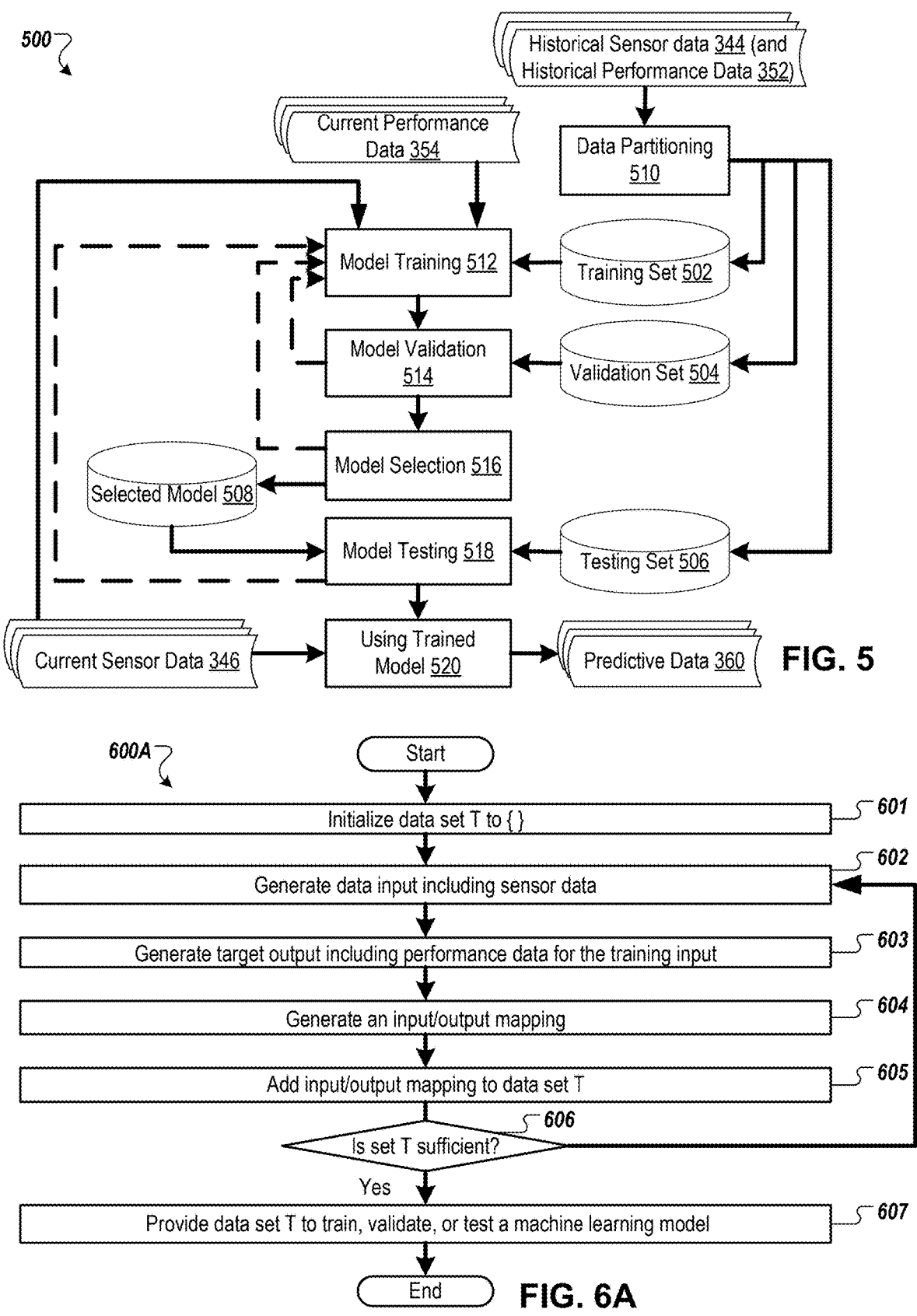

FIG. 5 is a block diagram illustrating a system 500 for generating predictive data 360, according to certain embodiments. The system 500 may be used to determine a corrective action associated with an EC window 130 based on the predictive data 360.

At block 510, the system 500 (e.g., cloud computing system 110 of one or more of FIGS. 1-3) performs data partitioning (e.g., via data set generator 372 of server machine 370 of FIG. 3) of the historical sensor data 344 (e.g., and historical performance data 352) to generate the training set 502, validation set 304, and testing set 306. For example, the training set may be 60% of the historical sensor data 344 (e.g., and historical performance data 352), the validation set may be 20% of the historical sensor data 344 (e.g., and historical performance data 352), and the testing set may be 20% of the historical sensor data 344 (e.g., and historical performance data 352). The system 500 may generate a plurality of sets of features for each of the training set, the validation set, and the testing set. For example, if the historical data (e.g., historical sensor data 344 and historical performance data 352) includes features derived from sensor data from 20 sensors (e.g., sensors 236 and/or 252 of FIGS. 2B, 2C, and/or FIG. 3) and 100 EC windows 130 (e.g., EC windows 130 that each correspond to the sensor data from the 20 sensors), a first set of features may be sensors 1-10, a second set of features may be sensors 11-20, the training set may be EC windows 1-60, the validation set may be EC windows 61-80, and the testing set may be EC windows 81-100. In this example, the first set of features of the training set would be sensor data from sensors 1-10 for EC windows 1-60.

At block 512, the system 500 performs model training (e.g., via training engine 382 of FIG. 3) using the training set 502. The system 500 may train multiple models using multiple sets of features of the training set 502 (e.g., a first set of features of the training set 502, a second set of features of the training set 502, etc.). For example, system 500 may train a machine learning model to generate a first trained machine learning model using the first set of features in the training set (e.g., sensor data from sensors 1-10 for EC windows 1-60) and to generate a second trained machine learning model using the second set of features in the training set (e.g., sensor data from sensors 11-20 for EC windows 1-60). In some embodiments, the first trained machine learning model and the second trained machine learning model may be combined to generate a third trained machine learning model (e.g., ensemble model, a model that may be a better predictor than the first or the second trained machine learning model on its own). In some embodiments, sets of features used in comparing models may overlap (e.g., first set of features being sensor data from sensors 1-15 and second set of features being sensors 5-20). In some embodiments, hundreds of models may be generated including models with various permutations of features and combinations of models.

At block 514, the system 500 performs model validation (e.g., via validation engine 384 of FIG. 3) using the validation set 504. The system 500 may validate each of the trained models using a corresponding set of features of the validation set 504. For example, system 500 may validate the first trained machine learning model using the first set of features in the validation set (e.g., sensor data from sensors 1-10 for EC windows 61-80) and the second trained machine learning model using the second set of features in the validation set (e.g., sensor data from sensors 11-20 for EC windows 61-80). In some embodiments, the system 500 may validate hundreds of models (e.g., models with various permutations of features, combinations of models, etc.) generated at block 512. At block 514, the system 500 may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 512 where the system 500 performs model training using different sets of features of the training set. Responsive to determining that one or more of the trained models has an accuracy that meets a threshold accuracy, flow continues to block 516. The system 500 may discard the trained machine learning models that have an accuracy that is below the threshold accuracy (e.g., based on the validation set).

At block 516, the system 500 performs model selection (e.g., via selection engine 385 of FIG. 3) to determine which of the one or more trained models that meet the threshold accuracy has the highest accuracy (e.g., the selected model 508, based on the validating of block 514). Responsive to determining that two or more of the trained models that meet the threshold accuracy have the same accuracy, flow may return to block 512 where the system 500 performs model training using further refined training sets corresponding to further refined sets of features for determining a trained model that has the highest accuracy.

At block 518, the system 500 performs model testing (e.g., via testing engine 386 of FIG. 3) using the testing set 506 to test the selected model 508. The system 500 may test, using the first set of features in the testing set (e.g., sensor data from sensors 1-10 for EC windows 81-100), the first trained machine learning model to determine the first trained machine learning model meets a threshold accuracy (e.g., based on the first set of features of the testing set 506). Responsive to accuracy of the selected model 508 not meeting the threshold accuracy (e.g., the selected model 508 is overly fit to the training set 502 and/or validation set 504 and is not applicable to other data sets such as the testing set 506), flow continues to block 512 where the system 500 performs model training (e.g., retraining) using different training sets corresponding to different sets of features (e.g., sensor data from different sensors). Responsive to determining that the selected model 508 has an accuracy that meets a threshold accuracy based on the testing set 506, flow continues to block 520. In at least block 512, the model may learn patterns in the historical sensor data 344 and historical performance data 352 to make predictions and in block 518, the system 500 may apply the model on the remaining data (e.g., testing set 506) to test the predictions.

At block 520, system 500 uses the trained model (e.g., selected model 508) to receive current sensor data 346 and determines (e.g., extracts), from the output of the trained model, predictive data 360 to perform corrective actions (e.g., associated with the EC windows 130, associated with the equipment 234, associated with the manufacturing and/ or installation parameters, or performance parameters). In some embodiments, the current sensor data 346 may correspond to the same types of features in the historical sensor data 344. In some embodiments, the current sensor data 346 correspond to a same type of features as a subset of the types of features in historical sensor data 344 that are used to train the selected model 508.

In some embodiments, current performance data 354 is received and the model 508 is re-trained based on the current sensor data 346 and the current performance data 354. In some embodiments, a new model is trained based on the current sensor data 346 and the current performance data 354.

In some embodiments, one or more of the operations 510-520 may occur in various orders and/or with other operations not presented and described herein. In some embodiments, one or more of operations 510-520 may not be performed. For example, in some embodiments, one or more of data partitioning of block 510, model validation of block 514, model selection of block 516, or model testing of block 518 may not be performed.

FIGS. 6A-E are flow diagrams of methods for providing corrective control (e.g., detection, prediction, and/or correction) of an electrochromic device (e.g., EC window 130), according to certain embodiments. The methods 600A-E can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 600A-E are performed by the cloud computing system 110 of one or more of FIGS. 1-3. In some embodiments, the methods 600A-E are performed by one or more server devices of the cloud computing system 110. In some embodiments, the methods 600A-E are performed by a processing device of the cloud computing system 110 (e.g., a non-transitory machine-readable storage medium storing instructions which, when executed cause a processing device to perform methods 600A-E). In some embodiments, the methods 600A-E are performed by control module 220 of the cloud computing system 110. In some embodiments, one or more portions of methods 600A-E are performed by one or more other components (e.g., gateway, etc.). For example, the server device may transmit instructions to the gateway and the gateway may use the instructions provide corrective control of an EC window 130.

For simplicity of explanation, methods 600A-E are depicted and described as a series of operations. However, operations in accordance with this disclosure can occur in various orders and/or concurrently and with other operations not presented and described herein. Furthermore, not all illustrated operations may be performed to implement methods 600A-E in accordance with the disclosed subject matter. In addition, those skilled in the art will understand and appreciate that methods 600A-E could alternatively be represented as a series of interrelated states via a state diagram or events.

FIG. 6A is a flow diagram of a method 600A for generating a data set for a machine learning model for generating predictive data (e.g., predictive data 360 of FIG. 3), according to certain embodiments. Method 600A may be performed by cloud computing system 110 (e.g., data set generator 372 of server machine 370 of FIG. 3).

Referring to FIG. 6A, at block 601 of method 600A, the processing logic initializes a training set T to an empty set.

At block 602, the processing logic generates first data input (e.g., first training input, first validating input) that includes sensor data (e.g., sensor data 342 of FIG. 3, historical sensor data 344 of FIG. 3). In some embodiments, the first data input may include a first set of features for types of sensor data and a second data input may include a second set of features for types of sensor data (e.g., as described with respect to FIG. 4).

In some embodiments, at block 603, the processing logic generates a first target output for one or more of the data inputs (e.g., first data input). The first target output may be corresponding performance data (e.g., historical performance data 352 of FIG. 3).

At block 604, the processing logic optionally generates mapping data that is indicative of an input/output mapping. The input/output mapping (or mapping data) may refer to the data input (e.g., one or more of the data inputs described herein), the target output for the data input (e.g., where the target output identifies historical performance data 352), and an association between the data input(s) and the target output.

At block 605, processing logic adds the mapping data generated at block 604 to data set T.

At block 606, the processing logic branches based on whether data set T is sufficient for at least one of training, validating, and/or testing machine learning model (e.g., model 390 of FIG. 3). If so, execution proceeds to block 607, otherwise, execution continues back at block 602. It should be noted that in some embodiments, the sufficiency of data set T may be determined based simply on the number of input/output mappings in the data set, while in some other implementations, the sufficiency of data set T may be determined based on one or more other criteria (e.g., a measure of diversity of the data examples, accuracy, etc.) in addition to, or instead of, the number of input/output mappings.

At block 607, the processing logic processing logic provides data set T (e.g., to server machine 180) to train, validate, and/or test machine learning model 390. In some embodiments, data set T is a training set and is provided to training engine 382 of server machine 380 to perform the training. In some embodiments, data set T is a validation set and is provided to validation engine 384 of server machine 380 to perform the validating. In some embodiments, data set T is a testing set and is provided to testing engine 386 of server machine 380 to perform the testing. In the case of a neural network, for example, input values of a given input/output mapping (e.g., numerical values associated with data inputs 410) are input to the neural network, and output values (e.g., numerical values associated with target outputs 420) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 607, machine learning model (e.g., machine learning model 390) can be at least one of trained using training engine 382 of server machine 380, validated using validating engine 384 of server machine 380, or tested using testing engine 386 of server machine 380. The trained machine learning model may be implemented by control module 220 (of predictive server 312) to generate predictive data 360 for performing corrective action associated with the electrochromic device.

In some embodiments, the data set includes data input and target output (e.g., labeled data, for supervised training). In some embodiments, the data set includes data input without target output (e.g., unlabeled data, for unsupervised training). The data set of data input may be used to train a machine learning model to identify groupings of electrochromic devices based on the data input (e.g., unsupervised training). In some embodiments, the data set includes labeled data and unlabeled data (e.g., for semi-supervised training). Semi-supervised training may utilize a data set where only some of the data was labeled (e.g., EC window 130 is known to have defects, EC window 130 is known to have a lower life span, etc.). This labeled data is used to help identify groups that can also be labeled through the use of an unsupervised algorithm. The partially labeled data may be used to help train a supervised algorithm to see if the algorithm identifies other units that can also be labeled. A small grouping of electrochromic devices may be indicative of abnormal electrochromic devices. In some embodiments, one or more trained machine learning models may be used (e.g., ensemble model) to determine whether the current sensor data is indicative of an electrochromic device that is abnormal and to determine whether the current sensor data is indicative of a classification of the electrochromic device. A first data set generated by method 600A may be used to train a first machine learning model and a second data set generated by method 600A may be used to train a second machine learning model (e.g., both to be used in an ensemble model). Feature aggregation and/or selection of data sets can be used to create different models. One or more models may be used for identifying abnormal performance and/or identifying hardware malfunctions of an EC window 130 and then group the EC window 130 into predicted categories of hardware malfunctions (e.g., leaky panel, electrical defects, soldering defects, manufacturing defects, etc.). In some embodiments, the same model (e.g., an ensemble model, etc.) may be used to identify abnormal performance and to identify hardware defects. In some embodiments, a first model may be used to identify abnormal performance and a second model may be used to identify defects.

FIG. 6B illustrates a method 600B for determining whether a corrective action is to be performed for an electrochromic device (e.g. EC window 130).

Referring to FIG. 6B, at block 608 of method 600B, the processing logic directs a current tinting state of the electrochromic device to correspond to a first tinting state. The first tinting state may be selected by a user (e.g., via tint selector 120, dashboard web app 140, dashboard mobile app 142, etc.) or the automation control module 224 may automatically select the first tinting state. The processing logic may then cause the tinting of the electrochromic device to correspond to the first tinting state by causing electrical current to be applied to the electrochromic device. The first tinting state may correspond to a specific amount of electrical current applied over a specific amount of time (e.g., a specific charge).

At block 610, the processing logic receives sensor data corresponding to a point in time subsequent to causing the current tinting state of the electrochromic device to correspond to the first tinting state. The sensor data may include one or more of voltage data corresponding to the electrochromic device, electrical current data corresponding to the electrochromic device, temperature data corresponding to one or more components of the electrochromic window system 100 (e.g., gateway 106, driver 104, etc.), image data corresponding to the electrochromic device, or the like.

At block 612, the processing logic receives sensor data corresponding to a point in time that is a period of time subsequent to the first point in time. During the period of time, the processing device may not direct a change of the tinting state of the electrochromic device. The processing logic may continue to receive sensor data during the period of time. After the tinting state of electrochromic device corresponds to the first tinting state (e.g., at the first point in time), the processing device can continuously, or intermittently receive sensor data (i.e., the sensor can continuously monitor data associated with the electrochromic device). The sensor data received at block 612 may be the same type of data received at block 610.

At block 614, the processing logic determines whether a corrective action is to be performed based on the sensor data. At block 614, the processing logic may determine (e.g., based on voltage data and/or electrical current data) whether the electrochromic device has a charge leakage. At block 614, the processing logic may determine (e.g., based on temperature data) whether a change in temperature of the one or more components of the EC window system 100 exceeds a threshold change in temperature. At block 614, the processing logic may determine (e.g., based on image data) whether the electrochromic device is changing tinting states without receiving instructions to change tinting state (e.g., is changing colors, is becoming less uniform, etc.). At block 614, the processing logic may determine (e.g., based on the voltage and/or electrical current data) hardware breakage associated with the electrochromic device. The processing logic may determine whether a corrective action is to be performed and/or what type of corrective action is to be performed based on one or more of a charge leakage, change in temperature, change in tinting state, hardware breakage, or the like.

The corrective action may include applying an electric current to an anode and cathode of the electrochromic device to bring the voltage across the device to the voltage corresponding to the first tinting state (i.e., if the voltage drops between receiving the first sensor data and the second sensor data). The corrective action may include using a different control component (e.g., a different driver, a different gateway). The corrective action may include causing a software or firmware to be updated (e.g., for the electrochromic device, for the driver, for the gateway, etc.). The corrective action may include causing an alert to be provided. The alert may indicate that a component is to be replaced, connection is to be reconfigured, an electrochromic device is to be replaced, or the like. In another example, if any parameters received in the sensor data indicates that a hardware failure has occurred (e.g., temperature fluctuations, voltage drops, tinting malfunction, etc.) the processing logic can determine that a corrective action is to be performed.

At block 616, the processing logic causes a corrective action to be performed for the electrochromic device. The processing logic may select the corrective action based on the sensor data that indicated that the corrective action is to be performed.

Figure 6C:
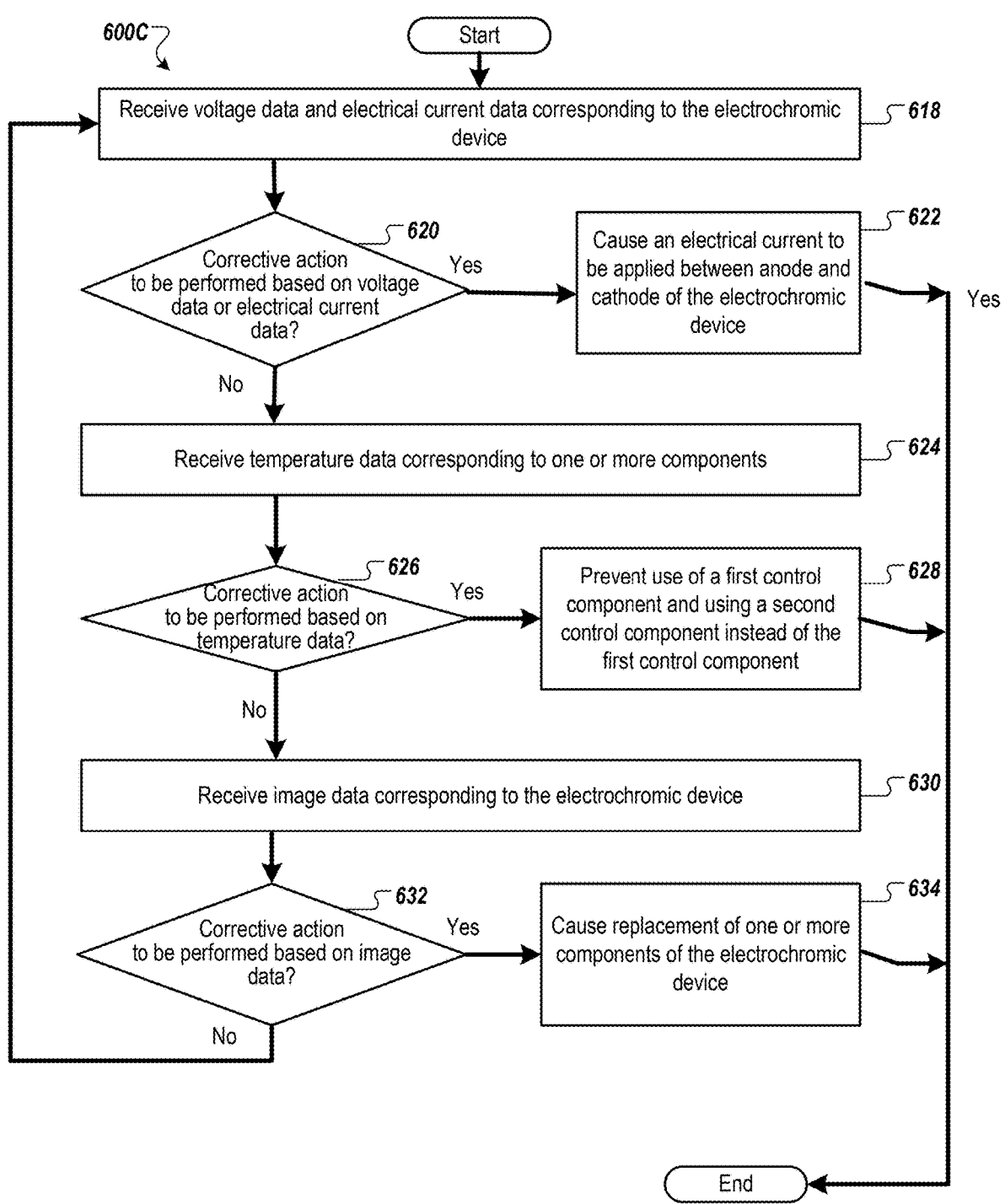

FIG. 6C illustrates a method 600C for determining whether a corrective action is to be performed based on different forms of received data.

Referring to FIG. 6C, at block 618 of method 600C, the processing logic receives voltage data and/or electrical current data corresponding to the electrochromic device. A driver that controls an EC window may monitor (e.g., receive, collect) the voltage data and/or electrical current data associated with an EC window and may transmit the voltage data and/or electrical current data to a gateway. The gateway may transmit the voltage data and/or electrical current data to the processing logic (e.g., of the cloud computing system 110, control module 220, and/or corrective control module 222). The voltage data may include one or more of first voltage values indicative of a voltage across an anode and cathode of the electrochromic device, second voltage values indicative of a voltage (e.g., a sense voltage) between two Vsense lines as a divergent signal, third voltage values indicative of voltages between a first sequestration area (e.g., electrode to pull charge out or put charge into the EC window) and the cathode, and/or fourth voltage values indicative of voltages between a second sequestration area and the cathode. The electrical current data may be indicative of the electrical current that is input into the electrochromic device through monitored pathways. The electrical current data may include one or more of first electrical current values indicative of electrical current that enters the anode, second electrical current values indicative of electrical current that exits the cathode, third electrical current values indicative of electrical current that enters the first sequestration area, or fourth electrical current values indicative of electrical current indicative of electrical current that enters the second sequestration area.

At block 620, the processing logic determines whether a corrective action is to be performed based on the voltage data and/or the electrical current data. The processing logic may determine that a corrective action is to be performed if one or more voltage values (e.g., the sense voltage and the anode and cathode voltage) change by a threshold amount over a period of time when there has been no directed change to the tinting of the electrochromic device. For example, when no change to the tinting state has been directed (e.g., via user input, via automated control), then electrical current has not been directed to be applied (or measured) at a monitored pathway. Thus, if a voltage is changing but electrical current has not been directed to be applied, then there may be an electrical current leak in the electrochromic device through unmonitored pathways. Responsive to determining that a corrective action is to be performed, flow continues to block 622. Responsive to determining that a corrective action is not to be performed, flow continues to block 624.

At block 622, the processing logic, in response to determining that a corrective action it to be performed based on the voltage data and the electrical current data, may cause an electric current to be applied between an anode and a cathode of the electrochromic device. The additional electrical current applied between the anode and cathode may increase the charge and thus the voltage across the electrochromic device. Thus, any charge lost to leakage currents may be replaced by the applied electrical current to keep the tinting level consistent at a selected and intended level. The processing logic may determine an amount of additional electrical current is to be applied and how often the amount of additional electrical current is to be applied. The processing logic may cause an alert indicating one or more of the detected current leakage, the predicted current leakage, the rate of change of the current leakage, a predicted lifespan of the electrochromic device (e.g., based on the current leakage), or the like.

At block 624, the processing logic receives temperature data (e.g., from heat sensors) corresponding to one or more components (e.g., drivers, control system components) associated with the electrochromic device. The temperature data may correspond to one or more of the electrochromic device, the driver, the gateway, the distributed EMS, electrical wiring, or the like At block 626, the processing logic determines whether a corrective action is to be performed based on the temperature data. The processing logic may compare the temperature data to one or more of previous temperature data of the same one or more components, previous temperature data of other one or more components, or the like. The processing logic may determine changes in the temperature data over time. Responsive to determining the temperature data and/or changes in the temperature data meet threshold values, the processing logic may determine a corrective action is to be performed. Responsive to determining a corrective action is to be performed, flow continues to block 628. Responsive to determining a corrective action is not to be performed, flow continues to block 630.

At block 628, the processing logic, in response to determining that a corrective action is to be performed based on the temperature data, prevents use of one or more components. The processing logic may prevent use of a first control component and causes use of a second control component instead of the first control component. For example, responsive to determining that a first driver has a temperature or change in temperature that exceeds a threshold value, the processing logic may cause a second driver to be used to control the electrochromic device (e.g., cause replacement of the first driver, use a second driver that is controlling a different electrochromic device to also control the electrochromic device, or the like). In another example, responsive to determining that a first gateway has a temperature or change in temperature that exceeds a threshold value, the processing logic may cause the electrochromic device to be controlled by a second gateway. The processing logic may cause an alert indicating one or more of the detected change in temperature, the predicted change in temperature, the rate of change of the temperature, a predicted lifespan of the component (e.g., based on the increase in temperature), that a component is to be replaced, that a different component is to be used, or the like.

At block 630, the processing logic receives image data corresponding to the electrochromic device. In some embodiments, at least a portion of the image data may be collected during manufacturing and/or installation of the electrochromic device. At least a portion of the image data may be collected after installation of the electrochromic device. Image data may be collected periodically. An imaging device may be used to periodically collect the image data. The imaging device may include one or more of an interior sensor (e.g., camera directed at the electrochromic device), an exterior sensor (e.g., camera outside of the building), a sensor disposed on the electrochromic device, a sensor disposed within the electrochromic device, one or more drones coupled to corresponding cameras that are to capture images from one or more locations (e.g., orientations, angles, elevations, etc.) of the electrochromic device, or the like. In some embodiments, the image data may be compared to previous image data of the same electrochromic device to determine whether the functionality of the electrochromic device is staying the same (e.g., same level of uniformity of tinting state, same level of uniformity in changing tinting states, same tinting state responsive to being directed to correspond to the same tinting state, same change or lack of change of tinting state over time, or the like). In some embodiments, the image data may be compared to historical image data of other electrochromic devices (e.g., to determine if the electrochromic device is maintaining tinting states, changing tinting states, corresponding to a tinting state, etc. similar to other non-defective electrochromic devices).

In some embodiments, the image data may correspond to images of physical stages of the electrochromic device during manufacturing. Thus, the image data may be used to identify defects that occurred during manufacturing that resulted in hardware defects or malfunctions after the device has already been installed. The processing device can utilize image data throughout the manufacturing process to both identify issues in the manufacturing process associated with installed defective windows as well as detecting and troubleshooting hardware malfunctions.

At block 632, the processing logic determines whether a corrective action is to be performed based on the image data. Responsive to the change in image data over time being greater than a threshold amount, a corrective action may be performed. Responsive to the image data not corresponding to image data of non-defective electrochromic devices, a corrective action may be performed. Responsive to determining a corrective action is to be performed, flow continues to block 634. Responsive to determining a corrective action is not to be performed, flow returns to block 618 to continue collecting sensor data.

At block 634, the processing logic, in response to determining that a corrective action is to be performed based on image data, a corrective action may be performed. In some embodiments, the corrective action may include resetting the electrochromic device (e.g., the electrochromic device is cause to corresponding to a known tinting state (e.g., most amount of transmissivity) to reset the electrochromic device). In some embodiments, the corrective action may include causing an electrical current to be applied between the anode and cathode of the electrochromic device to maintain a tinting state. In some embodiments, the corrective action may include causing replacement of one or more components of the electrochromic device. The corrective action can include providing an indication that a hardware failure has occurred and that components (e.g., specific components) of the electrochromic device are to be replaced. In one example, the corrective action may include indicating that the entire electrochromic device should be replaced.

In method 600C, the processing logic may receive different types of sensor data and the processing logic may determine whether and what type of corrective action is to be performed based on the sensor data. The sensor data may include sensor data received over time (e.g., periodically after installation). The sensor data may include sensor data received during manufacturing, installation, and/or transportation.

Figures 6D, 6E:
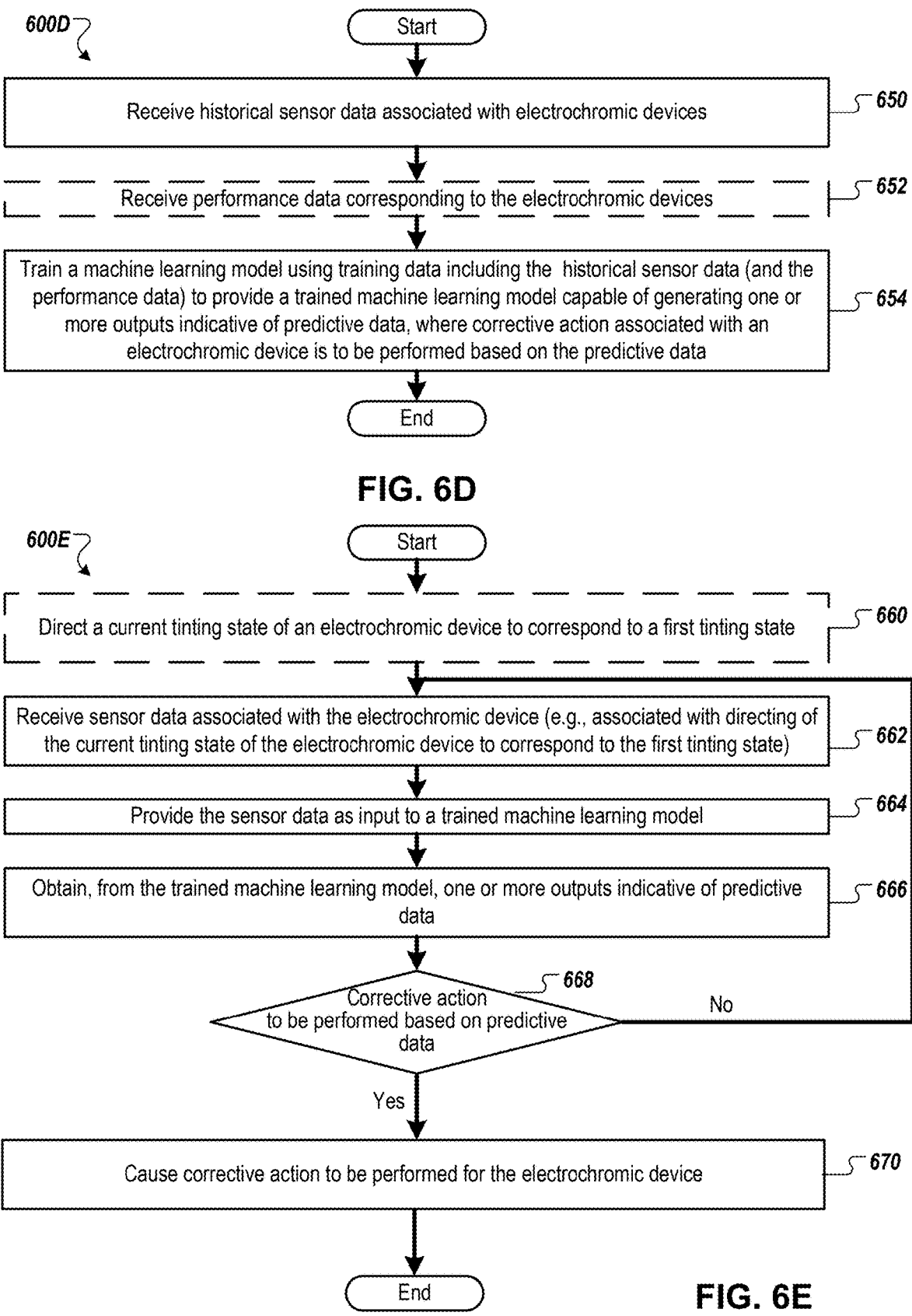

FIG. 6D illustrates a method 600D of training a machine learning model for determining whether a corrective action is to be performed for an electrochromic device (e.g., EC window 130).

Referring to FIG. 6D, at block 650 of method 600D, the processing logic receives historical sensor data associated with electrochromic devices. In some embodiments, the processing logic processes the historical sensor data. The historical sensor data may include one or more of image data, voltage data, electrical current data, temperature data, acoustic data, impedance data, or the like. In some embodiments, the sensor data may be processed to aggregate sensor data from different sensors. In some embodiments, the sensor data comprises differences in sensor data over time (e.g., without directing current tinting state of the electrochromic device to change). In some embodiments, sensor data comprises images and the images may be processed into color space values (e.g., L*a*b* color scheme values).

In some embodiments, at block 652, the processing logic may receive performance data corresponding to the electrochromic devices. The performance data may include one or more of an indication of whether the electrochromic device was defective, lifespan of the electrochromic device, metrology data, performance data (e.g., speed of changing tinting states, color of tinting states, uniformity of tinting states, or the like), a portion (e.g., percentage, number) of the electrochromic devices that were defective, or the like.

At block 654, the processing logic trains a machine learning model using training data including the (processed) historical sensor data (e.g., and the performance data) to provide a trained machine learning model capable of generating one or more outputs indicative of predictive data. A corrective action associated with an electrochromic device may be performed based on the predictive data based on current sensor data of the electrochromic device (e.g., see FIG. 6E).

FIG. 6E illustrates a method 600E of using a trained machine learning model to determine whether a corrective action is to be performed for an electrochromic device (e.g., EC window 130).

Referring to FIG. 6E, at block 660 of method 600E, the processing logic may direct a current tinting state of an electrochromic device to correspond to a first tinting state. Block 660 may be similar to block 608 of FIG. 6B.

At block 662, the processing logic receives sensor data associated with the electrochromic device (e.g., associated with directing of the current tinting state of the electrochromic device to correspond to the first tinting state). Block 662 may be similar to block 610 and/or block 612 of FIG. 6B.

At block 664, the processing logic provides sensor data as input to a trained machine learning model (e.g., the trained machine learning model of block 654 of FIG. 6D). In some embodiments, in method 600E, the processing logic may provide the sensor data as input to train a machine learning model. In some embodiments, sensor data is used to train the model before outputs are obtained (e.g., block 654 of FIG. 6D) and the processing logic may use transfer learning or models that have been trained on other electrochromic devices to test each electrochromic device. In some embodiments, at least two models are running in parallel. A first model may be trained only on data of one electrochromic device (e.g., the current electrochromic device) and a second model may be trained on data of multiple electrochromic devices including the current electrochromic device.

At block 666, the processing logic obtains, from the trained machine learning model, one or more outputs indicative of predictive data. The predictive data may be indicative with one or more of a cluster of electrochromic devices (e.g., abnormal, normal, etc.) to which the electrochromic device belongs, a classification of the electrochromic device (e.g., defective, not defective, etc.), whether the electrochromic device is abnormal, a ranking of causes of the defects of the electrochromic device, predicted metrology data, predictive property data (e.g., predicted end of life of the electrochromic device, etc.), a type of corrective action that is to be performed for the electrochromic device, or the like. In some embodiments, clustering algorithms and/or survival analysis probabilities may be used to identify and group panels (e.g., within time groupings, within expected life-span groupings). Determining corrective solutions may be derived (e.g., in part) from this grouping and identifying of electrochromic devices that assist in predicting long term behavior (e.g., of other electrochromic devices). In some embodiments, a model may be trained on only properly performing electrochromic devices and then the model may be used to detect any electrochromic device that is not performing similar to the known properly performing electrochromic devices. To deploy a model (e.g., a neural net) for anomaly detection, the model may be trained on properly functioning electrochromic devices, the root mean squared deviation (RMSD) may be calculated, and then the model may be run on any electrochromic device. A corrective action may be performed (e.g., providing an alert that there is an issue) responsive to determining the RMSD has changed more than a threshold amount. To avoid overly-fitting the model to training data (e.g., of properly functioning electrochromic devices), the model may be tested by inputting data of known poorly-performing electrochromic devices to provide a larger error value (e.g., from not matching well).

At block 668, the processing logic determines whether a corrective action is to be performed based on the predictive data. Responsive to determining a corrective action is to be performed, flow continues to block 670. Responsive to determining a corrective action is not to be performed, flow continues to block 662.

At block 670, the processing logic causes a corrective action to be performed for the electrochromic device. Block 670 may be similar to block 616 of FIG. 6B. In some embodiments, the corrective action may include flagging the electrochromic device to be added to a watch list until a classification is confirmed and the electrochromic device is identified and flagged (e.g., as leaky). Data associated with the electrochromic devices in the watch list may periodically be one or more of compared to other classified electrochromic devices, input into the trained machined learning model, or the like to determine if any of the electrochromic devices in the watch list may be classified. In some embodiments, user input may be used to identify the electrochromic devices in the watch list.

In some embodiments, electrochromic window performance can degrade over time due to one or more of temperature, user misuse, certain tint levels or changing of tint levels under particular conditions (e.g., direct sunlight, temperature changes, for threshold periods of time), etc. In some embodiments, processing logic monitors the electrochromic devices (e.g., receives sensor data at block 662 of FIG. 6E) to detect performance changes (e.g., via blocks 664-668 of FIG. 6E). The processing logic may detect performance changes before the performance changes become visible by the human eye, such as detecting performance change in speed of tinting before becoming noticeable by a user or before the electrochromic window fails to fully bleach.

In some embodiments, the processing logic detects performance changes via data exploration and scheduled tests during maintenance. In some embodiments, a machine learning model is trained (e.g., via method 600D of FIG. 6D) to benchmark normal performance to then detect (e.g., via method 600E of FIG. 6E) changes in any sensor data (e.g., data points, variables).

In some embodiments, at block 650 of FIG. 6D, sensor data of properly functioning electrochromic devices is identified. At block 654 of FIG. 6D, a machine learning model is trained using input data of the sensor data of properly functioning electrochromic devices (e.g., without providing target output data, by performing unsupervised training). The trained machine learning model may be over-trained (e.g., an over-trained neural net) on the sensor data of properly functioning electrochromic devices. The trained machine learning model may provide a threshold metric (e.g., error score, acceptable range of error scores) representative of the properly functioning electrochromic devices. The threshold metric may be used as a benchmark for future sensor data (e.g., to monitor changes to electrochromic windows, other devices, customer use patterns, etc.). In some embodiments, the threshold metric (e.g., a single number, a single error score, a range) is based on multiple variables (e.g., sensor data from the different manufacturing facilities, sensor data from transportation, sensor data from usage, temperature, image data, electrical data, all variables associated with an electrochromic window, speed of tinting, etc.).

The trained machine learning model (e.g., over-trained model) may be used for performance and degradation monitoring. The sensor data may include many variables and the trained machine learning model may be used to learn behaviors and combine sensor data into a single threshold metric (e.g., combining values of many variables across many dimensions) that can be monitored and used (e.g., in manual or automated decision making). When the current metric changes, the processing logic may determine that a change has occurred and that the device that is being monitored is no longer performing as normal (e.g., performance has degraded). The monitoring may be performed on many data points and the relationships between the points. How the data points interact may be learned by the trained machine learning model.

In some embodiments, the trained machine learning model is a trained statistical program that is used to monitor performance and detect signs of degradation. The trained machine learning model learns the normal operating performance benchmark (e.g., threshold metric, averaged on multiple electrochromic devices or on a single electrochromic device). The trained machine learning model may learn the normal operating performance benchmark as a multidimensional, always changing, performance pattern, and outputs a threshold metric (e.g., an error score) indicative of performance of the electrochromic device (e.g., a benchmark of normal performance).

At block 662 of FIG. 6E, the processing logic may identify (e.g., collect) sensor data associated with an electrochromic device.

At block 664 of FIG. 6E, the processing logic may provide sensor data to the trained machine learning model (e.g., that has been over-trained based on sensor data from properly functioning electrochromic devices).

At block 666 of FIG. 6E, the processing logic may obtain, from the trained machine learning model, a current metric (e.g., error score, error term).

At block 668 of FIG. 6F, the processing logic may compare the current metric to the threshold metric to determine whether a corrective action is to be performed (e.g., determine whether the error score for the electrochromic device has increased, determine whether performance has changed). For example, the processing logic may determine whether the current error score is within the range of error scores determined in block 654. The threshold metric (e.g., acceptable range of error scores) may be tuned to detected very small changes. The threshold metric may be used to monitor many (e.g., thousands) of variables. Responsive to the current error score being within the range of error scores, flow continues to block 662. Responsive to the current error score being outside of the range of error scores, the processing logic may determine that a corrective action is to be performed. Changes in the current metric (e.g., error score) based on new sensor data over time may indicate a change in performance of the electrochromic device.

At block 670 of FIG. 6E, the processing logic may cause performance of a corrective action (e.g., provide an alert to a user or administrator, cause a manual response, cause an automated response, provide a notification with a recommended action to improve life of the electrochromic device, etc.) responsive to detecting the change in sensor data (e.g., data points). The corrective action may include a performing one or more bleach cycles (e.g., cycles of lessening the tint level to an untinted level, cycle including tinting and untinting, etc.), training the user on how to care for the system to obtain maximum life, etc. In some implementations, the processing logic may cause misuse (e.g., of an electrochromic device) to be overridden so that proper use occurs.

In some embodiments, the processing logic may cause performance of the corrective action responsive to threshold changes in the error score. The trained machine learning model may be used to identify performance degrading patterns and to perform root cause analysis when changes occur (e.g., based on what happened before and after the error score changed). The processing logic receives sensor data (e.g., monitors use) of the electrochromic devices and can cause an alert to be provided (e.g., to support personnel or to the user) responsive to detecting improper use (e.g., this may use a different model that is trained to know what improper use looks like with temperature and sunlight data as inputs). Changes in use patterns can be detected and notifications can be sent.

In some embodiments, one or more machine learning models can be trained on user data and the processing logic can cause an alert to be provided (e.g., to a user, to an account manager) based on variation (e.g., a threshold amount of variation, change in normal patterns of a user, patterns of a user that may cause damage to the electrochromic device) in the use of the electrochromic device and/or other devices. In some embodiments, one or more machine learning models are trained based on the chemicals used, manufacturing procedures, transportation, installation, and/or use of the electrochromic devices (e.g., machine learning models may be deployed in chemical factories, assembly factories, installation locations, etc.).

In some embodiments, a machine learning model is trained by method 600D based on sensor data from multiple electrochromic devices. The trained machine learning model may be used by many specific electrochromic devices (e.g., transfer learning, a threshold metric that applies as a starting place for multiple electrochromic devices). For each electrochromic device, the trained machine learning model may be further trained (e.g., repeating method 600D) based on sensor data from that specific electrochromic device (e.g., the threshold metric becomes specific for that electrochromic device). At the beginning of transfer learning, the processing logic may compare an electrochromic device to other electrochromic devices (e.g., a threshold metric of a model trained based on sensor data from multiple electrochromic devices). Over time, the processing logic compares the electrochromic device to past performance of the same electrochromic device (e.g., threshold metric of a model further trained based on the sensor data of the same electrochromic device).

Figure 7:
FIG. 7 illustrates a plot of sensor data for an EC window over a period of time, according to certain embodiments.

FIG. 7 illustrates a plot 700 of sensor data (e.g., electrical charge data, voltage data) for EC windows 130 over a period of time, according to certain embodiments. FIG. 7 illustrates EC windows 130 that include a non-leaky EC window 130A and a leaky EC window 130B. A leaky EC window 130B refers to an electrochromic device that has a pathway for electrical current to leak off voltage (e.g., gradually losing charge) overtime without being directed to change tinting states (e.g., a hardware failure of the EC window 130 includes an unintended pathway through which charge is lost resulting in unintended bleaching (lessening of the tint) of the window). A leaky EC window 130B may be set to a first tinting state and over time the leaky EC window 130B transitions to a second tinting state without being directed to change tinting states.

A non-leaky EC window 130A may be directed to a first tinting state at a first point in time and at a second point in time a period of time after the first point in time (e.g., during the period of time, the EC window 130A was not directed to change tinting states), the current tinting state of the non-leaky EC window 130A may be substantially the same as the first tinting state.

The upper portion of the plot 700 illustrates panel charge activity of EC windows 130 (e.g., Coulombs (C)). The panel charge activity is a charge value of the EC window 130 that is driven by the driver 104 (e.g., an expected charge value). Each charge value corresponds to a different tinting state. The driver is to set the tinting state by driving the EC window 130 to a charge value (e.g., 255 C) and the EC window 130 is expected to maintain the charge value (e.g., 255 C) and associated tinting state until the driver drives a different charge value (e.g., 0 C).

Portions 702A and 702B illustrate a constant charge (e.g., 255 C) indicating that the driver is not actively changing the tinting state (e.g., not actively bleaching) the EC windows 130. Portion 703 has a change in charge (e.g., bleaching or resetting from 225 C to about 0 C and back to 225 C). Portion 703 indicates when the driver is actively changing the tinting state (e.g., bleaching and re-tinting) of the EC windows 130.

The lower portion of the plot illustrates the voltage (e.g., sense voltage) of the EC windows 130 over the same period of time as the panel charge activity. Voltage 704 is associated with a non-leaky EC window 130A. Voltage 704 remains substantially the same while the driver is not actively changing the tinting state of EC window 130A (e.g., EC window 130A does not have a defect that leaks off current). Voltage 704 may represent an expected voltage for EC windows 130.

Voltage 706 is associated with a leaky EC window 130B. In some embodiments, the leaky EC window 130B may have a defect that causes a current pathway to leak off voltage over time. In some embodiments, the leaky EC window 130B may be connected to leak equipment (e.g., see leak equipment 810 of FIG. 8) to simulate a defective EC window 130B. Voltage 706 indicates the leaky EC window 130B is gradually losing charge (e.g., and gradually bleaching) as demonstrated by a decrease in voltage over time without directing change in tinting state. Voltage 706 represents no "top-off" command being sent.

For EC windows 130A that are functioning properly without a leak, the measured voltages 704 remain substantially (e.g., essentially) at the same level after a tint level is selected (and no other tint level is selected afterward).

For a leaky EC window 130B, a measured voltage 706 may decrease over a period of time after a tint level is selected. As depicted, the expected voltage (e.g., corresponding to voltage 704 of non-leaky windows 130A) remains at a substantially constant level (i.e., another tint level has not been selected) while the measured voltage 706 of a leaky EC window 130B decreases as time elapses. Therefore, the leaky EC window 130B may be at a lower tint level than intended by a user of the leaky EC window 130B. Different leaky panels may leak at different rates. For example, the change in tint level may be over a short period of time such as a period of minutes or a longer period of time such a days or weeks. When the leak is slow, the issue may be difficult to detect by a visual inspection of the leaky EC window 130B and thus may be difficult to diagnose. However, as depicted in FIG. 7, the corrective control module 222 may identify (e.g., detect and/or predict) the leak and may provide for a corrective action. In the case of a leaky panel, the corrective action may include driving additional charge (e.g., a "top-off" command 708) to the EC window 130 to increase the measured voltage 706 back to, or close to, the expected voltage (e.g., corresponding to voltage 704 of non-leaky EC windows 130).

In one example, the top-off command 708 is initiated when the difference between the expected voltage and the measured voltage 706 is larger than a threshold difference. In another example, the top-off command 708 is initiated after a threshold number of leak detections occur (e.g., after four leak detections, the command is initiated). In some embodiments, a top-off command 708 may be sent after one or more positive leak detections (e.g., four positive leak detections) including a first detection of a positive leaky classification by machine learning (e.g., random cut forest model) using processed drive data (e.g., over a two minute window). The top-off command 708 may also be initiated periodically once the corrective control module 222 has determined that the panel is leaky. As described with respect to FIGS. 3, 4, 5, and 6, the leak may detected using one or more machine learning models 390 trained using historical sensor data 344 and/or historical performance data 352. The corrective control module 222 may input current sensor data 346 of the EC window of FIG. 7 into the trained machine learning model 390 and may predict, based on output of the trained machine learning model 390, whether the EC window is a leaky panel (e.g., losing charge over time) and may predict a corrective action (e.g., top-off commands 708 indicating how much and how often additional charge is to be added to the EC window) to maintain tinting states. The sensor data (e.g., amount of charge lost over time) and performance data (e.g., corrective action, top-off commands 708, etc.) of the EC window of FIG. 7 may be used to train or re-train a machine learning model 390.

Figure 8:
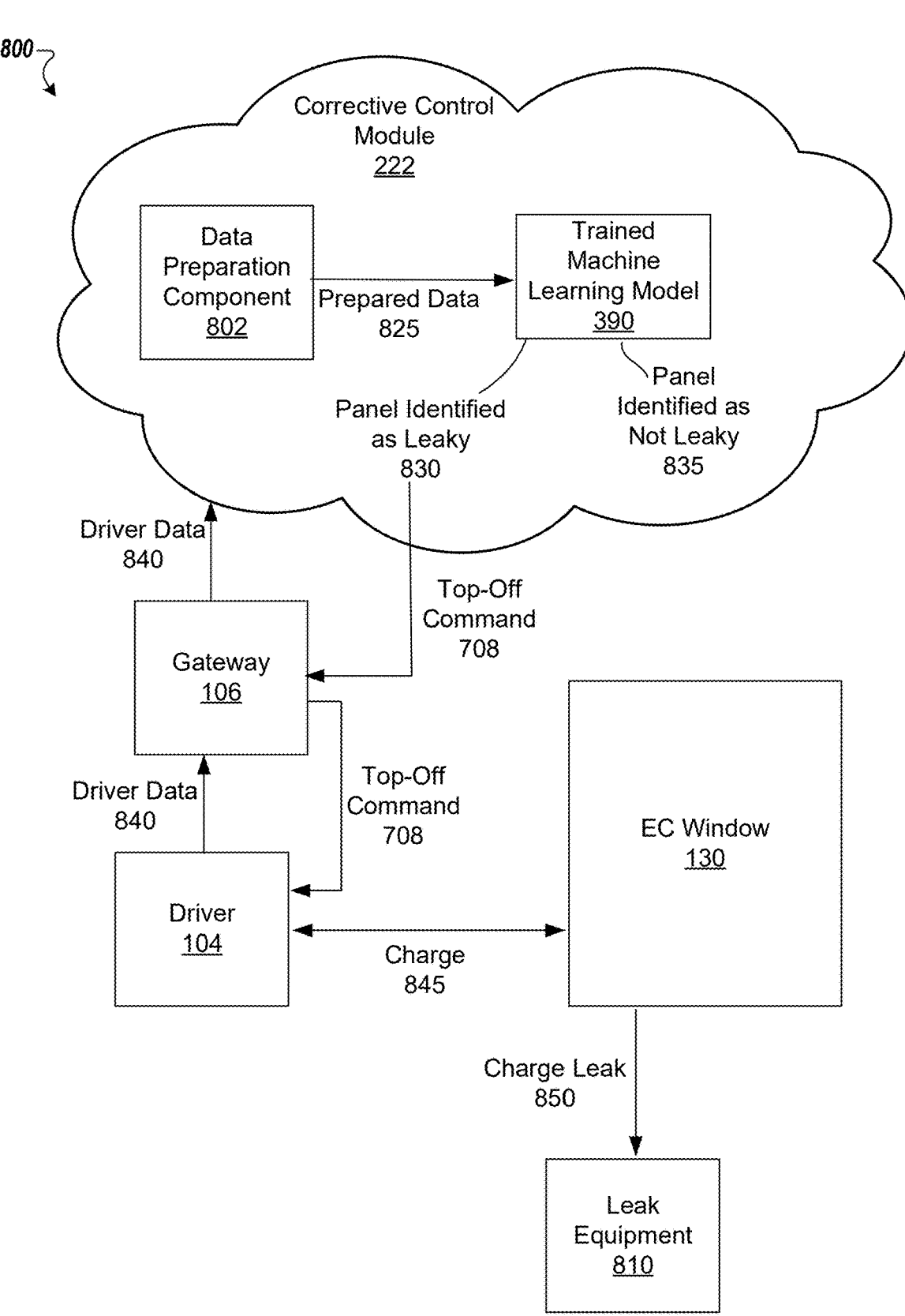
FIG. 8 illustrates an example system for generating simulated leaky panel data and for testing a trained machine learning model, according to certain embodiments.

FIG. 8 illustrates an example system 800 for generating simulated leaky panel data (e.g., for EC windows) and for generating (e.g., training, validating, testing) a trained machine learning model 390, according to certain embodiments. The system 800 may include a corrective control module 222, a gateway 106, a driver 104, an EC window 130 and leak equipment 810. The corrective control module 222 may include a data preparation component 802 and a trained machine learning model 390. The data preparation component 802 may include filtering of data and feature engineering to obtain prepared data 825 that is to be used for identifying leaky EC windows (e.g., to be the most highly effective data in identifying leaky panels). The prepared data 825 may be data that magnifies the differences between a normal EC window and a leaky EC windows. The prepared data 825 may be forwarded to the trained machine learning model 390 which may identify whether an EC window is leaky 830 or not leaky 835. If the EC window is identified as not leaky 835 then no corrective action is initiated. However, if the EC window is identified as leaky 830 then a top-off command 708, as described in FIG. 7, may be sent to a gateway 106 (as described in FIG. 1). The gateway may then forward the top-off command 708 to a driver 104 to provide additional charge 845 to the EC window 130. Driver data 840 may also be relayed back to the corrective control module 222 through the gateway 106, for further analysis and tracking of sensor data and performance data.

In some embodiments, leak equipment 810 may be coupled to the EC window 130 to drain charge from the EC window 130. The leak equipment 810 thus may cause the EC window 130 emulate a leaky panel by providing for a charge leak 850 from the EC window 130. Thus, sensor data and performance data may be collected by the corrective control module 222 that identifies EC window 130 as a leaky panel without requiring EC window 130 to be an actual leaky panel. The leak equipment 810 may leak charge at different rates so that data associated with the different leak rates may be collected by the corrective control module 222. The data collected may then be used to further train the machine learning model 390. Additionally, the collected data may be used to test the trained machine learning model 390 to determine whether the trained machine learning model 390 accurately determines a corrective action is to be performed for the EC window 130 (e.g., determine whether the top-off command 708 associated with the corrective action determined by the trained machine learning model 390 substantially matches the charge leak 850 caused by the leak equipment 810). In some embodiments, historical sensor data 344 and historical performance data 352 used to train a machine learning model 390 are associated with one or more normal EC windows 130 (e.g., normal EC windows 130 operated with and/or without leak equipment 810). In some embodiments, the historical sensor data 344 and historical performance data 352 used to train a machine learning model 390 may not be associated with abnormal EC windows (e.g., are associated with normal EC windows 130 operated with and/or without leak equipment 810). In some embodiments, data from normal EC windows 130 operated with leak equipment is used in conjunction with data from abnormal EC windows 130 to train a machine learning model 390.

Figure 9:
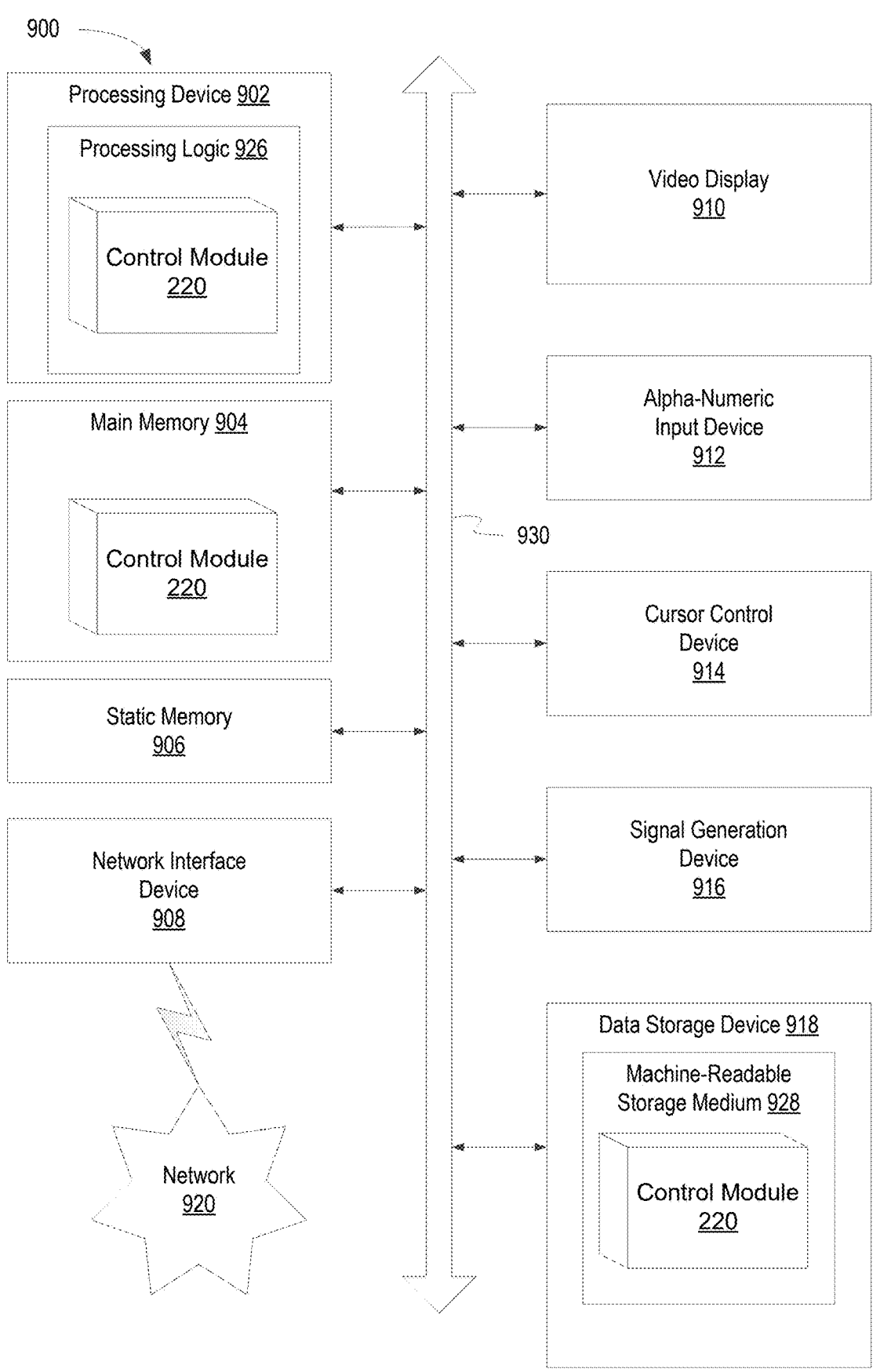
FIG. 9 illustrates a diagrammatic representation of a machine in the example form of a computer system including a set of instructions executable by a computer system to control an electrochromic device according to any one or more of the methodologies discussed herein.

FIG. 9 illustrates a diagrammatic representation of a machine in the example form of a computer system including a set of instructions executable by a computer system 900 for control of an electrochromic device (e.g., corrective control of an EC window 130) according to any one or more of the methodologies discussed herein. In some embodiments, computer system 900 includes one or more server devices of a cloud computing system (e.g., cloud computing system 110 of one or more of FIGS. 1-3). The computer system 900 may have more or less components than those shown in FIG. 9 (e.g., one or more server devices of cloud computing system 110 may have fewer components than shown in computer system 900). In one embodiment, the computer system may include instructions to enable execution of the processes and corresponding components shown and described in connection with FIGS. 1-8.

In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein In some embodiments, the example computer system 900 (e.g., cloud computing system 110) includes a processing device (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 918, which communicate with each other via a bus 930. In some embodiments, memory (e.g., main memory 904, data storage device 918, etc.) may be spread across one or more mediums (e.g., of an on-demand cloud computing platform).

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. In various implementations of the present disclosure, the processing device 902 is configured to execute instructions for performing the operations and processes described herein (e.g., the control module 220 of FIGS. 2-3, methods 600A-E of FIGS. 6A-E, etc.).

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a computer-readable storage medium 928 (or machine-readable medium) on which is stored one or more sets of instructions embodying any one or more of the methodologies or functions described herein. The instructions may also reside, completely or at least partially, within the main memory 904 and/or within processing logic 926 of the processing device 902 during execution thereof by the computer system 900, the main memory 904 and the processing device 902 also constituting computer-readable media.

The instructions may further be transmitted or received over a network 920 via the network interface device 908. While the computer-readable storage medium 928 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "causing," "receiving," "determining," "directing," "converting," "providing," "obtaining," "training," "interrupting," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

causing a current tinting state of an installed electrochromic window to correspond to a first tinting state, wherein the installed electrochromic window is installed in a wall of a building;

receiving, from one or more components housed within the installed electrochromic window, first sensor data corresponding to a first point in time subsequent to the causing of the current tinting state of the installed electrochromic window to correspond to the first tinting state;

receiving, from the one or more components housed within the installed electrochromic window, second sensor data corresponding to a second point in time that is a period of time subsequent to the first point in time, wherein the first sensor data and the second sensor data each comprise at least one of voltage data or electrical current data which correspond to a tinting state of the installed electrochromic window, wherein the second sensor data is same type as the first sensor data;

determining, based on the first sensor data and the second sensor data, whether a corrective action is to be performed for the installed electrochromic window, wherein determining whether the corrective action is to be performed comprises comparing the first sensor data and the second sensor data to identify one or more of a charge leakage of the installed electrochromic window, a software error, or hardware breakage associated with the installed electrochromic window; and responsive to determining the corrective action is to be performed, causing the corrective action to be performed for the installed electrochromic window.

2. The method of claim 1, wherein the causing of the corrective action comprises one or more of:

causing an electrical current to be applied between an anode and cathode of the installed electrochromic window to restore an electric charge of the installed electrochromic window to maintain the first tinting state;

preventing use of a first control component and using a second control component instead of the first control component; or causing replacement of one or more corresponding components associated with the installed electrochromic window.

3. The method of claim 1, wherein:

the first sensor data comprises a first sense voltage value corresponding to a sense voltage between an anode and a cathode of the installed electrochromic window;

the second sensor data comprises a second sense voltage value corresponding to the sense voltage between the anode and the cathode of the installed electrochromic window;

the determining whether the corrective action is to be performed comprises:

determining a difference between the first sense voltage value and the second sense voltage value; and in response to determining that the difference is larger than a threshold difference, determining that the corrective action is to be performed.

4. The method of claim 1 further comprising:

receiving corresponding electrical current data corresponding to electrical current between an anode and cathode of the installed electrochromic window during the period of time, wherein the first sensor data comprises a first voltage value and the second sensor data comprises a second voltage value;

determining an expected voltage value based on the corresponding electrical current data and the first voltage value, wherein the determining whether the corrective action is to be performed comprises:

determining a difference between the expected voltage value and the second voltage value; and in response to determining that the difference is larger than a threshold difference, determining that the corrective action is to be performed.

5. The method of claim 1, wherein the determining whether the corrective action is to be performed for the installed electrochromic window comprises:

providing the first sensor data and the second sensor data as input to a trained machine learning model;

obtaining, from the trained machine learning model, one or more outputs indicative of predictive data; and determining, based on the predictive data, whether the corrective action is to be performed for the installed electrochromic window.

6. The method of claim 5, wherein the predictive data is indicative of one or more of:

whether the installed electrochromic window is abnormal compared to a plurality of installed electrochromic windows;

a grouping of the installed electrochromic window with one or more historical installed electrochromic windows;

a classification of the installed electrochromic window; or a predicted defect of the installed electrochromic window.

7. The method of claim 1 further comprising:

receiving historical sensor data associated with one or more installed electrochromic windows;

receiving historical performance data corresponding to the one or more installed electrochromic windows; and training a machine learning model using training data including the historical sensor data and the historical performance data to generate a trained machine learning model, the trained machine learning model being capable of generating one or more outputs indicative of predictive data, wherein the corrective action associated with the installed electrochromic window is to be performed based on the predictive data.

8. The method of claim 7, wherein the historical sensor data and the historical performance data are associated with simulating a corresponding charge leak in the one or more installed electrochromic windows.

9. A non-transitory machine-readable storage medium storing instructions which, when executed cause a processing device to perform operations comprising:

causing a current tinting state of an installed electrochromic window to correspond to a first tinting state, wherein the installed electrochromic window is installed in a wall of a building;

receiving, from one or more components housed within the installed electrochromic window, first sensor data corresponding to a first point in time subsequent to the causing of the current tinting state of the installed electrochromic window to correspond to the first tinting state;

receiving, from the one or more components housed within the installed electrochromic window, second sensor data corresponding to a second point in time that is a period of time subsequent to the first point in time, wherein the first sensor data and the second sensor data each comprise at least one of voltage data or electrical current data which correspond to a tinting state of the installed electrochromic window, wherein the second sensor data is same type as the first sensor data;

determining, based on the first sensor data and the second sensor data, whether a corrective action is to be performed for the installed electrochromic window, wherein determining whether the corrective action is to be performed comprises comparing the first sensor data and the second sensor data to identify one or more of a charge leakage of the installed electrochromic window, a software error, or hardware breakage associated with the installed electrochromic window; and responsive to determining the corrective action is to be performed, causing the corrective action to be performed for the installed electrochromic window.

10. The non-transitory machine-readable storage medium of claim 9, wherein the causing of the corrective action comprises one or more of:

causing an electrical current to be applied between an anode and cathode of the installed electrochromic window to restore an electric charge of the installed electrochromic window to maintain the first tinting state;

preventing use of a first control component and using a second control component instead of the first control component; or causing replacement of one or more corresponding components associated with the installed electrochromic window.

11. The non-transitory machine-readable storage medium of claim 9, wherein:

the first sensor data comprises a first sense voltage value corresponding to a sense voltage between an anode and a cathode of the installed electrochromic window;

the second sensor data comprises a second sense voltage value corresponding to the sense voltage between the anode and the cathode of the installed electrochromic window;

the determining whether the corrective action is to be performed comprises:

determining a difference between the first sense voltage value and the second sense voltage value; and in response to determining that the difference is larger than a threshold difference, determining that the corrective action is to be performed.

12. A system comprising:

a memory; and a processing device communicably coupled to the memory, the processing device to:

cause a current tinting state of an installed electrochromic window to correspond to a first tinting state, wherein the installed electrochromic window is installed in a wall of a building;

receive, from one or more components housed within the installed electrochromic window, first sensor data corresponding to a first point in time subsequent to causing of the current tinting state of the installed electrochromic window to correspond to the first tinting state;

receive, from the one or more components housed within the installed electrochromic window, second sensor data corresponding to a second point in time that is a period of time subsequent to the first point in time, wherein the first sensor data and the second sensor data each comprise at least one of voltage data or electrical current data which correspond to a tinting state of the installed electrochromic window, wherein the second sensor data is same type as the first sensor data;

determine, based on the first sensor data and the second sensor data, whether a corrective action is to be performed for the installed electrochromic window, wherein determining whether the corrective action is to be performed comprises comparing the first sensor data and the second sensor data to identify one or more of a charge leakage of the installed electrochromic window, a software error, or hardware breakage associated with the installed electrochromic window; and responsive to determining the corrective action is to be performed, cause the corrective action to be performed for the installed electrochromic window.

13. The system of claim 12, wherein:

the first sensor data comprises a first sense voltage value corresponding to a sense voltage between an anode and a cathode of the installed electrochromic window;

the second sensor data comprises a second sense voltage value corresponding to the sense voltage between the anode and the cathode of the installed electrochromic window;

to determine whether the corrective action is to be performed, the processing device is to:

determine a difference between the first sense voltage value and the second sense voltage value; and in response to determining that the difference is larger than a threshold difference, determine that the corrective action is to be performed.

14. The system of claim 12, wherein to determine whether the corrective action is to be performed for the installed electrochromic window the processing device is to:

provide the first sensor data and the second sensor data as input to a trained machine learning model;

obtain, from the trained machine learning model, one or more outputs indicative of predictive data; and determine, based on the predictive data, whether the corrective action is to be performed for the installed electrochromic window.

15. The system of claim 14, wherein the predictive data is indicative of one or more of:

whether the installed electrochromic window is abnormal compared to a plurality of installed electrochromic windows;

a grouping of the installed electrochromic window with one or more historical installed electrochromic windows;

a classification of the installed electrochromic window; or a predicted defect of the installed electrochromic window.

16. The system of claim 12, wherein the processing device is further to:

receive historical sensor data associated with one or more installed electrochromic windows;

receive historical performance data corresponding to the one or more installed electrochromic windows; and train a machine learning model using training data including the historical sensor data and the historical performance data to generate a trained machine learning model, the trained machine learning model being capable of generating one or more outputs indicative of predictive data, wherein the corrective action associated with the installed electrochromic window is to be performed based on the predictive data.

* * * * *